US00RE40769E

(19) United States
(12) Reissued Patent
Nagaoka et al.

(10) Patent Number: US RE40,769 E
(45) Date of Reissued Patent: Jun. 23, 2009

(54) METHOD AND APPARATUS FOR CONTROLLING THE GRAY SCALE OF PLASMA DISPLAY DEVICE

(75) Inventors: Keishin Nagaoka, Kawasaki (JP); Masaya Tajima, Kawasaki (JP); Yoshimasa Awata, Kawasaki (JP); Yoshikazu Kanazawa, Kawasaki (JP); Toshio Ueda, Kawasaki (JP)

(73) Assignee: Hitachi, Ltd., Tokyo (JP)

(21) Appl. No.: 09/938,303
(22) Filed: Aug. 24, 2001

Related U.S. Patent Documents

Reissue of:
(64) Patent No.: 5,943,032
Issued: Aug. 24, 1999
Appl. No.: 08/488,201
Filed: Jun. 7, 1995

U.S. Applications:
(63) Continuation-in-part of application No. 08/188,772, filed on Jan. 31, 1994, now abandoned.

(30) Foreign Application Priority Data

Nov. 17, 1993 (JP) ..... 05-288345

(51) Int. Cl.
*G09G 3/28* (2006.01)
*G09G 5/10* (2006.01)

(52) U.S. Cl. ..... 345/63; 345/589; 345/690
(58) Field of Classification Search ..... 345/60–72, 345/208, 210, 589–591, 690; 315/169.4; 313/581–587
See application file for complete search history.

(56) References Cited

U.S. PATENT DOCUMENTS 4,378,556 A * 3/1983 Wisnieff ..... 345/63
4,414,544 A * 11/1983 Suste ..... 345/63
4,818,982 A * 4/1989 Kuehn et al. ..... 345/63

(Continued)

FOREIGN PATENT DOCUMENTS

EP 0 488 891 * 6/1992
JP 4-195188 * 7/1992
JP 4-299385 10/1992

OTHER PUBLICATIONS

Nanto et al., "A 15–in–Diagonal Color Surface Discharge Ac–Plasma Display Panel", Japan Display 89, pp. 202–205.*

(Continued)

*Primary Examiner*—Jimmy H Nguyen
(74) *Attorney, Agent, or Firm*—Staas & Halsey LLP

(57) ABSTRACT

[A method of controlling the gray scale of a plasma display device has a forming step of forming a frame for an image by a plurality of subframes each having a different brightness, a setting step of setting the number of sustain emissions of each subframe in an anti-geometrical progression corresponding to the brightness of each subframe, and a displaying step of displaying the image on the plasma display device by a gray scale display having a specific brightness. The number of sustain emissions in each subframe is set individually by the each subframe, and this establishes a linear relation between the gray level and the corresponding brightness Therefore, an enhancement of display quality of the plasma display device can be realized.] *A method of controlling the gray scale of a plasma display device has a forming step of forming a frame for an image by a plurality of subframes each having a different brightness, a setting step of setting the number of sustain emissions of each subframe in an anti-geometrical progression corresponding to the brightness of each subframe, and a displaying step of displaying the image on the plasma display device by a gray scale display having a specific brightness. The number of sustain emission in each subframe is set individually by the each subframe, and this establishes a linear relation between the gray level and the corresponding brightness. Therefore, an enhancement of display quality of the plasma display device can be realized.*

72 Claims, 14 Drawing Sheets

U.S. PATENT DOCUMENTS

| | | | | | |
|---|---|---|---|---|---|
| 5,155,414 | A | * | 10/1992 | Sano | 315/169.4 |
| 5,231,382 | A | * | 7/1993 | Tanaka | 345/60 |
| 5,298,893 | A | * | 3/1994 | Sekine | 345/63 |
| 5,315,695 | A | * | 5/1994 | Saito et al. | 345/102 |
| 5,317,334 | A | * | 5/1994 | Sano | 345/63 |
| 5,408,226 | A | * | 4/1995 | Kwon | 345/60 |
| 5,475,448 | A | * | 12/1995 | Saegusa | 348/797 |
| 5,489,918 | A | * | 2/1996 | Mosier | 345/89 |
| 5,541,618 | A | * | 7/1996 | Shinoda | 345/60 |
| 5,583,527 | A | * | 12/1996 | Fujisaki et al. | 345/55 |
| 5,724,054 | A | * | 3/1998 | Shinoda | 345/60 |

OTHER PUBLICATIONS

Shinoda et al., "Improvement of Luminance and Luminous Efficiency of Surface–Discharge Colr ac PDP", SID 91 Digest, pp. 724–727.*

Yoshikawa et al., "A Full Color AC Plasma Display with 256 Gray Scale", Japan Display 92, pp. 605–608.*

Kanagu et al., "A 31–in.–Diagonal Full–Color Surface–Discharge ac Plasma Display Panel", SID 92 Digest, pp. 724–727.*

Shinoda et al., "Invited Address: Development of Technologies for Large–Area AC Plasma Displays", Sid 93 Digest, pp. 161–16.*

* cited by examiner

WHOLE-SCREEN WRITING
ADDRESS
ADDRESS PERIOD
(SELF-ERASE ADDRESS IN A LINE SEQUENCE)

* TO CAUSE WRITING DISCHARGE ALL OVER THE SCREEN, AND SELECT DISPLAY CELLS LINE BY LINE

SUSTAIN DISCHARGE PERIOD

* THE NUMBER OF SUSTAIN DISCHARGES OF EACH SUBFRAME (OR SUBFIELD) IS OF THE RATE 1:2:4:8

METHOD AND APPARATUS FOR CONTROLLING THE GRAY SCALE OF PLASMA DISPLAY DEVICE

Matter enclosed in heavy brackets [ ] appears in the original patent but forms no part of this reissue specification; matter printed in italics indicates the additions made by reissue.

[CROSS REFERENCE TO RELATED APPLICATION

This application is a continuation-in-part application of Ser. No. 08/188,772 filed on Jan. 31, 1994, abandoned.]

*CROSS-REFERENCE TO RELATED APPLICATION*

*This application is a reissue application of U.S. Pat. No. 5,943,032 issued Aug. 24, 1999; which is continuation-in-part application of U.S. application Ser. No. 08/188,772 filed Jan. 31, 1994, now abandoned.*

BACKGROUND OF THE INVENTION

1. Field of the Invention

The present invention relates to a method and an apparatus for controlling the gray scale of a plasma display devices and more particularly, to a method and an apparatus for controlling the gray scale of a three-electrode surface-discharge alternating current plasma display device.

2. Description of the Related Art

In the prior art, there has been known an alternating current plasma display panel (AC PDP) in which luminescence and display is done by applying a voltage wave-form to two sustain electrodes alternately to maintain discharge. In this AC PDP, a discharge operation is carried out in one to several microseconds (μs) just after the pulse application. Further, ions (positive charges) produced by the discharge accumulate on the surface of the dielectric layer on the electrode to which a negative voltage is being applied and similarly electrons (negative charges) accumulate on the surface of the dielectric layer of the electrode to which a positive voltage is being applied.

When applying a pulse (sustain pulse) of a lower voltage (sustain voltage or sustain discharge voltage) with a different polarity after first discharging with higher voltage (write voltage) pulse (write pulse) to produce wall charges, previously accumulated wall charges are overlapped yielding a high voltage with respect to the discharge space, the voltage exceeding the threshold voltage value of discharges which causes a discharge to begin. That is, there is a characteristic that once a cell is written to discharge generated wall charges, the discharge is sustained by applying sustain pulses alternately in opposite polarity. It is called a memory effect or a memory function Generally, an AC PDP makes use of the memory effect. Recently, as to AC PDPs, there has been proposed a two-electrode type in which selective discharge (address discharge) and sustain discharge are carried out with two electrodes, and a three-electrode type in which the third electrode is used for address discharge. In a color PDP used for a color displays a phosphor formed in a discharged cell is excited by ultraviolet rays generated by the discharge. However, there is a disadvantage that the phosphor is easily affected by bombardment of ions (positive charges) generated concurrently by discharge.

In the above mentioned two-electrode type, the arrangement is such that ions strike directly against phosphors, which is likely to lead to a reduction in the life of the phosphors. In order to avoid this, a three-electrode arrangement is generally used making use of surface discharge in a color PDP. Further, in such a three-electrode type, there are cases of forming a third electrode on the substrate on which the first and second electrode for sustain discharge is disposed and of forming it on another substrate facing the former. Also, in case of forming the said third electrode on the same substrate, there are the cases of disposing the third electrode on the two electrode for sustain discharge and of disposing it under them. Furthermore, in some cases visible light emitted from phosphors is viewed through the phosphors, and in the other cases reflected light from the phosphors is viewed. In this specification, explanations are given taking an example of a panel in which the third electrode is formed on the substrate different from and facing that of electrodes for sustain discharge.

By the ways recently, higher level gray scales in many display lines have become necessary in an AP PDP with the requirements of a larger display size, a larger number of pixels (cells) and full color display in a display panel. Furthers it is required for an AC PDP to control the gray scale thereof by desired brightness, or appropriate brightness.

SUMMARY OF THE INVENTION

An object of the present invention is to provide a gray scale controlling method for a plasma display device which enhances the display quality of the plasma display device by establishing a linear relation between the gray level and the corresponding brightness.

According to the present invention there is provided a method of controlling the gray scale of a plasma display device, wherein the method comprises the steps of forming a frame for an image by a plurality of subframe each having a different brightness; setting the number of sustain emissions of the each subframe in an anti-geometrical progression corresponding to the brightness of each subframe; and displaying the image on the plasma display device by a gray scale display having a specific brightness.

The plasma display device may be a three-electrode plasma display device. The three-electrode plasma display device may be a three-electrode surface discharge AC plasma display device.

The three-electrode plasma display device may comprise first and second electrodes arranged in parallel with each other; and third electrodes orthogonal to the first and second electrodes, the first electrode being commonly connected together, and the second electrodes being arranged for display lines, respectively, wherein the display device has a surface discharge structure employing wall charges as memory media.

The three-electrode plasma display device may further comprise a first substrate, and the first and second electrodes being arranged in parallel with each other on the first substrate and paired for respective display lines; a second substrate spaced apart from and facing the first substrate, and the third electrodes being arranged on the second substrate away from and orthogonal to the first and second electrodes; a wall charge accumulating dielectric layer covering the surfaces of the first and second electrodes and the first substrate; a phosphor formed over the third electrodes and the second substrate; a discharge gas sealed in a cavity defined between the first and second substrates; and cells formed at intersections where the first and second electrodes cross the third electrodes.

The plasma display device may be a two-electrode plasma display device. The two-electrode plasma display device may be a two-electrode facing-discharge AC-driven plasma display panel.

The two-electrode plasma display device may comprise a plurality of first electrodes; and a plurality of second electrodes orthogonal to the first electrodes, and the first electrodes being arranged for display lines, respectively, wherein the display device has a surface discharge structure employing wall charges as memory media.

The two-electrode plasma display device may further comprise a first substrate, and the first electrode being arranged in parallel on the first substrate; a second substrate spaced apart from and facing the first substrate, and the second electrodes being arranged on the second substrate away from and orthogonal to the first electrodes; a wall charge accumulating dielectric layer convering the surfaces of the first electrodes and the first substrate; a phosphor formed over the second electrodes and the second substrate; a discharge gas sealed in a cavity defined between the first and second substrates; and cells formed at intersections where the first electrodes cross the second electrodes.

The number of sustain emissions of the each subframe may be so calculated, that the brightness obtained by one subframe of the plurality of subframes having an arbitrary brightness may be twice the brightness obtained by another subframe of the plurality of subframes having a brightness next to that of the one subframe.

The number of sustain emissions of the each subframe may be so calculated, that the sum of the squares of errors with the ideal values in the each gray level becomes minimum, in order to make the relation between the gray level and the corresponding brightness linear.

The brightness of one subframe of the plurality of subframes having next larger gray level than that of another subframe of the plurality of subframes may not exceed the brightness of the another subframe, for the brightness of the another subframe having the arbitrary gray level. The sum of the numbers of sustain emissions of several subframes in the plurality of subframes may be specified. The brightness of the subframe having the maximum gray level may be specified in the plurality of subframes.

The number of sustain emissions of the each subframe may be so calculated, that the sum of the absolute values of errors with the ideal values in the each gray level becomes minimum in order to make the relation between the gray level and the corresponding brightness linear.

The brightness of one subframe of the plurality of subframes having next larger gray level than that of another subframe of the plurality of subframes may not exceed the brightness of the another subframe, for the brightness of the another subframe having the arbitrary gray level. The sum of the numbers of sustain emissions of several subframes in the plurality of subframes may be specified The brightness of an optional subframe may be specified in the plurality of subframes.

Further, according to the present invention, there is also provided a plasma display device comprising at least one pair of electrodes for carrying out a discharge operation, wherein the plasma display device is driven separating address periods in which display data are written in the screen, the display data is necessary for sustain discharge from sustain discharge periods in which sustain discharge for light emission is repeated, one frame forming an image is constituted by a plurality of subframes each having a different brightness, the number of sustain emissions of the each subframe is set in an anti-geometrical progression corresponding to the brightness of the each subframe, and the image is displayed on the plasma display device by a gray scale display having a predetermined brightness.

The plasma display device may further comprise a memory for setting and storing the number of sustain emissions in each subframe, and information on the number of sustain emissions in the each subframe may be read at any time from the memory. The memory may be constituted by a vacant area of a driving wave-form memory device in the plasma display device, and the information on the number of sustain emissions in the each subframe may be set in the vacant area of the driving wave-form memory device. The plasma display device may further comprise a brightness controller for adjusting the brightness, and the brightness controller selects one piece from the information on the number of sustain emissions in the each subframe may set in the memory.

The number of sustain emissions in the each subframe may be set as a plurality of combinations in the memory, and an arbitrary one of the plurality of combinations may be selected by selection signals supplied from the outside of the plasma display device. The plasma display device may further comprise a consumed current controller for controlling and keeping the consumed current below a predetermined value, the number of sustain emissions in the each subframe may be set as a plurality of combinations in the memory, an arbitrary one of the plurality of combinations may be selected in response to the output from the consumed current controller, and thereby the power consumption may be kept constant regardless of the change of display rate. The information on the number of sustain emissions in the each subframe may be supplied from the outside of the plasma display device.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

For a better understanding of the preferred embodiments of the present invention, the problems of the prior art will be explained with reference to FIGS. 1A to 7.

Figure 1A:
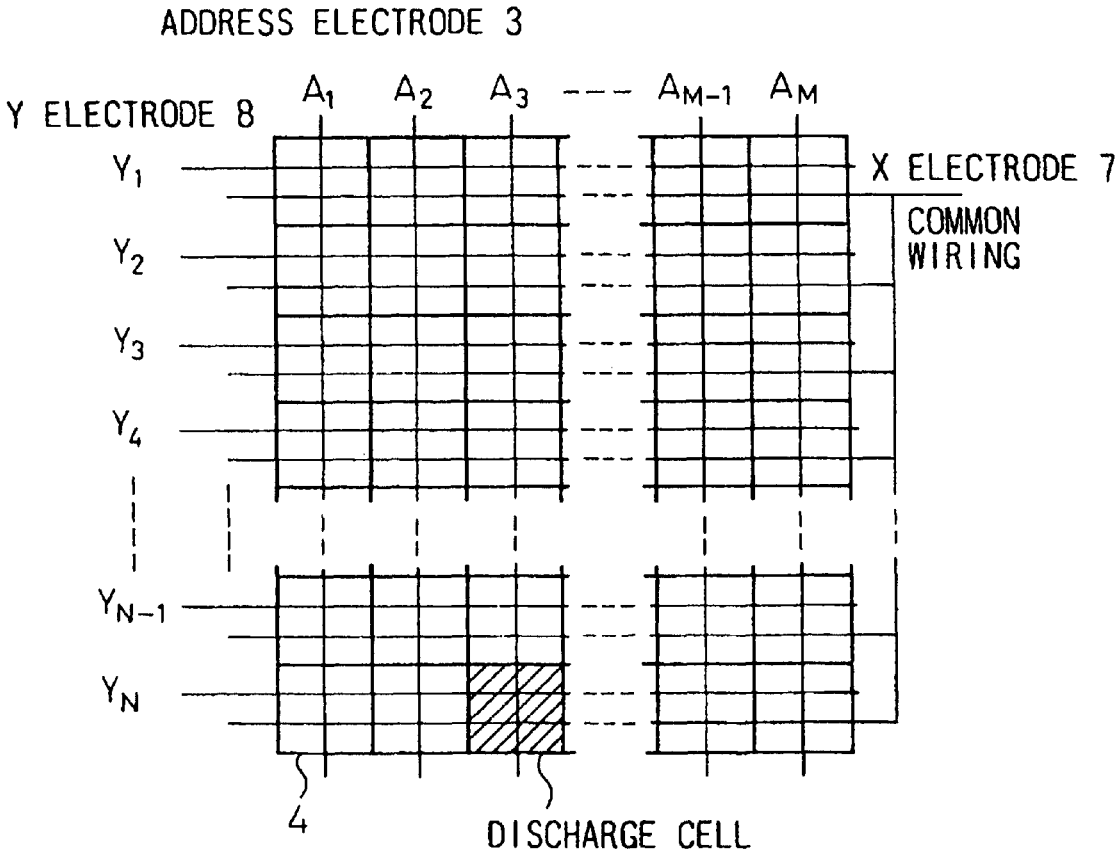
Fig.1A (PRIOR ART)
FIG. 1A is a plan diagram schematically showing an arrangement of the three-electrode surface-discharge AC-driven plasma display panel according to the prior art.
Figure 1B:
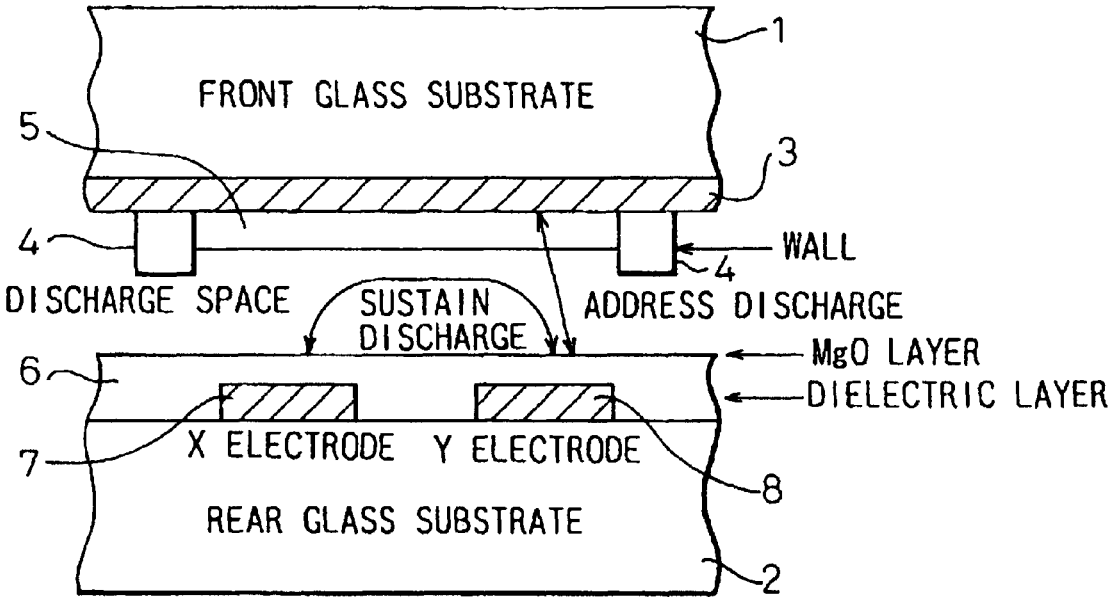
Fig.1B (PRIOR ART)
FIG. 1B is a sectional diagram schematically showing an arrangement of a discharge cell in the plasma display panel of FIG. 1A.

FIG. 1A shows an arrangement of a three-electrode surface-display AC-drive plasma display panel according to the prior art, and FIG. 1B shows an arrangement of a discharge cell in the plasma display panel of FIG. 1A. Note that FIG. 1A shows the arrangement (electrode arrangement) constituted by an M×N dot panel.

FIGS. 1A and 1B, reference numeral 1 denotes a front glass substrates 2 denotes a rear glass substrate, 3 denotes address electrodes, 4 denotes walls, 5 denotes a phosphor, 6 denotes a dielectric layer, 7 and 8 denote X and Y electrodes, respectively In this AC PDP (three-electrode plasma display panel), discharge operation occurs mainly between the two sustain discharge electrodes (X electrode 7 and Y electrode 8) disposed on the rear glass substrate 2, and the selection of pixels (or discharge cell) according to the display data is done by selecting a cell on the line including the corresponding Y electrode 8 making use of discharge between the Y electrode 8 and the address electrode 3.

Note that, on each sustain discharge electrode 7 and 8, the dielectric layer 6 is formed for insulation, on which a protective layer, or an MgO layer is formed. Further, on the front glass substrate 1 facing the rear glass substrate 2, the address electrode 3 and phosphors 5 are formed. Note that, the phosphors 5 have red, green and blue light emitting characteristics, and they are formed on the address electrodes 3

As shown in FIG. 1B, a discharge space (cavity) is so separated by the walls (barrier ribs) 4 formed on one side or both sides of the glass substrate that discharge occurs in a space of each cell. Ultraviolet light produced by the discharge causes the phosphor to emit light. Arranging a plurality M×N of cells having such structure, for example, in a matrix state forms a display panel as shown in FIG. 1A. Not that, in FIG. 1A, references A1 to AM denote address electrode, and Y1 to YN denote Y electrodes. Further, X electrodes 7 are commonly connected.

Figure 2A:
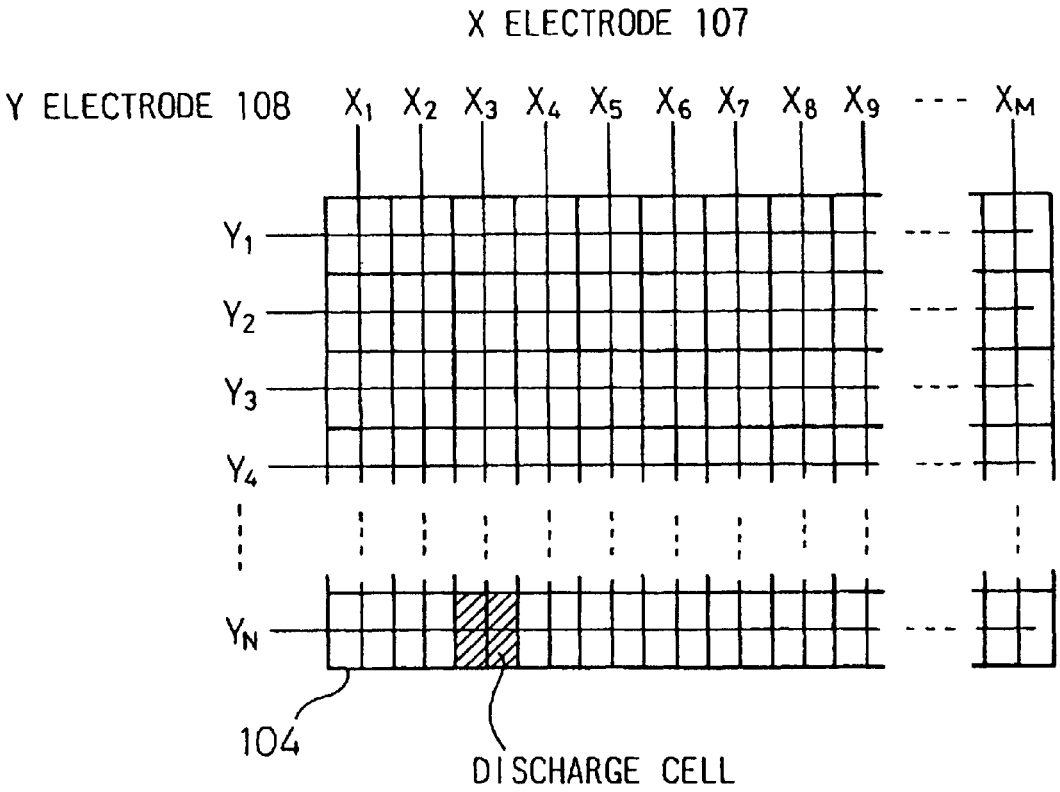
Fig. 2A (PRIOR ART)
FIG. 2A is a plan diagram schematically showing an arrangement of a two-electrode facing-discharge AC-driven plasma display panel according to the prior art.
Figure 2B:
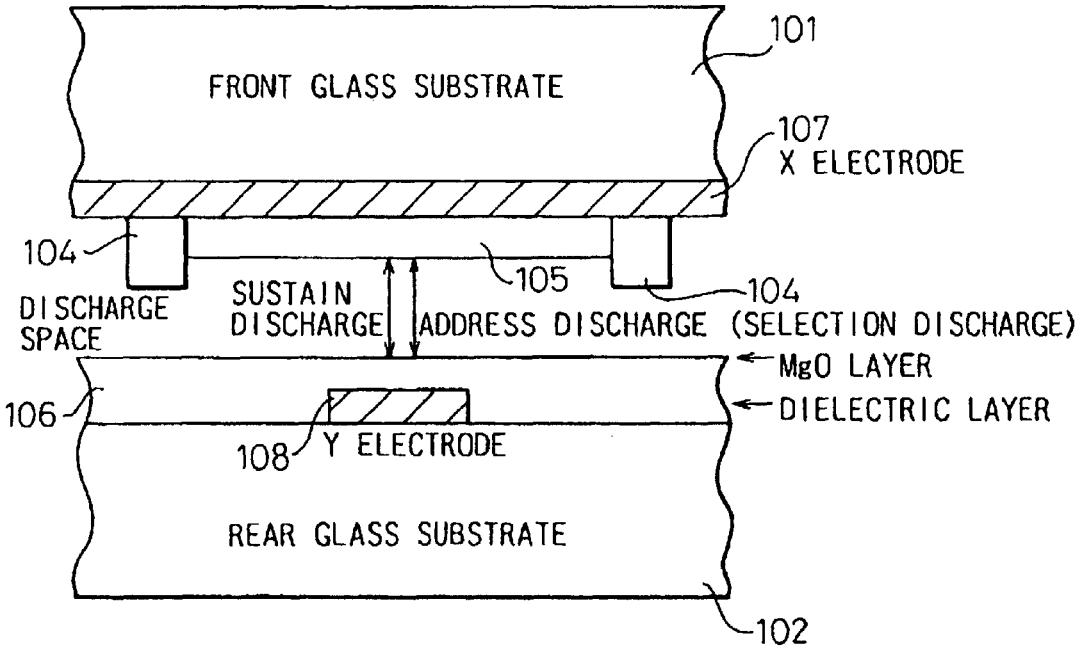
Fig. 2B (PRIOR ART)
FIG. 2B is a sectional diagram schematically showing an arrangement of a discharge cell in the plasma display panel of FIG. 2A.

FIG. 2A shows an arrangement of a two-electrode facing-discharge AC-driven plasma display panel which can employ the present; and FIG. 2B shows an arrangement of a discharge cell in the plasma display panel of FIG. 2A. Note that FIG. 2A shows the arrangement (electrode arrangement) constituted by an M×N dot panel similar to that shown in FIG. 1A.

In FIGS. 2A and 2B, reference numeral 101 denotes a front glass substrate, 102 denotes a rear glass substrate, 104 denotes wall, 105 denotes a phosphor, 106 denotes a dielectric layer, 107 denotes X electrodes, and 108 denote Y electrodes. By comparing the plasma display panel of FIGS. 2A and 2B with that of FIGS. 1A and 1B the X electrodes 107 of the two-electrode plasma display panel corresponds to address electrodes 3 of the three-electrode plasma display panel. Further, in the two-electrode plasma display panel shown in FIGS. 2A and 2B, electrodes corresponding to the X electrodes 7 of the three-electrode plasma display panel are deleted.

Namely, in this two-electrode plasma display panel, a first sustain discharge electrode (X electrode 107) is disposed on the front glass substrate 101, and a second sustain discharge electrode (Y electrode 108) is disposed on the rear glass substrate 102. Therefore, the selection of pixels (or discharge cell) according to the display data is done by selecting a cell on the line including the corresponding Y electrode 108 making use of discharge between the Y electrode 108 and the X electrode 107.

As shown in FIG. 2B, the dielectric layer 106 is formed on the rear glass substrate 102 and the Y electrode 108, and an MgO layer (protective layer) is formed on the dielectric layer 106. Further, the phosphors 105 have red, green and blue light emitting characteristics, and they are formed on the X electrodes 107.

As shown in FIG. 2B, a discharge space (cavity) is so separated by the walls (barrier ribs) 104 formed on one side or both sides of the glass substrate that discharge occurs in a space of each cell, and ultraviolet light produced by the discharge causes the phosphor to emit light. Arranging a plurality of M×N of cells having such structure, for example, in a matrix state forms a display panel as shown in FIG. 2A, similar to that shown in FIG. 1A.

Note that a gray scale controlling method for a plasma display device according to the present invention (which will be explained below in detail) is not only applied to a three-electrode surface-discharge AC-driven plasma display, but also applied to a two-electrode facing-discharge AC-driven plasma display. Further, a gray scale controlling method of the present invention can be applied to a various types of plasma display devices.

Figure 3:
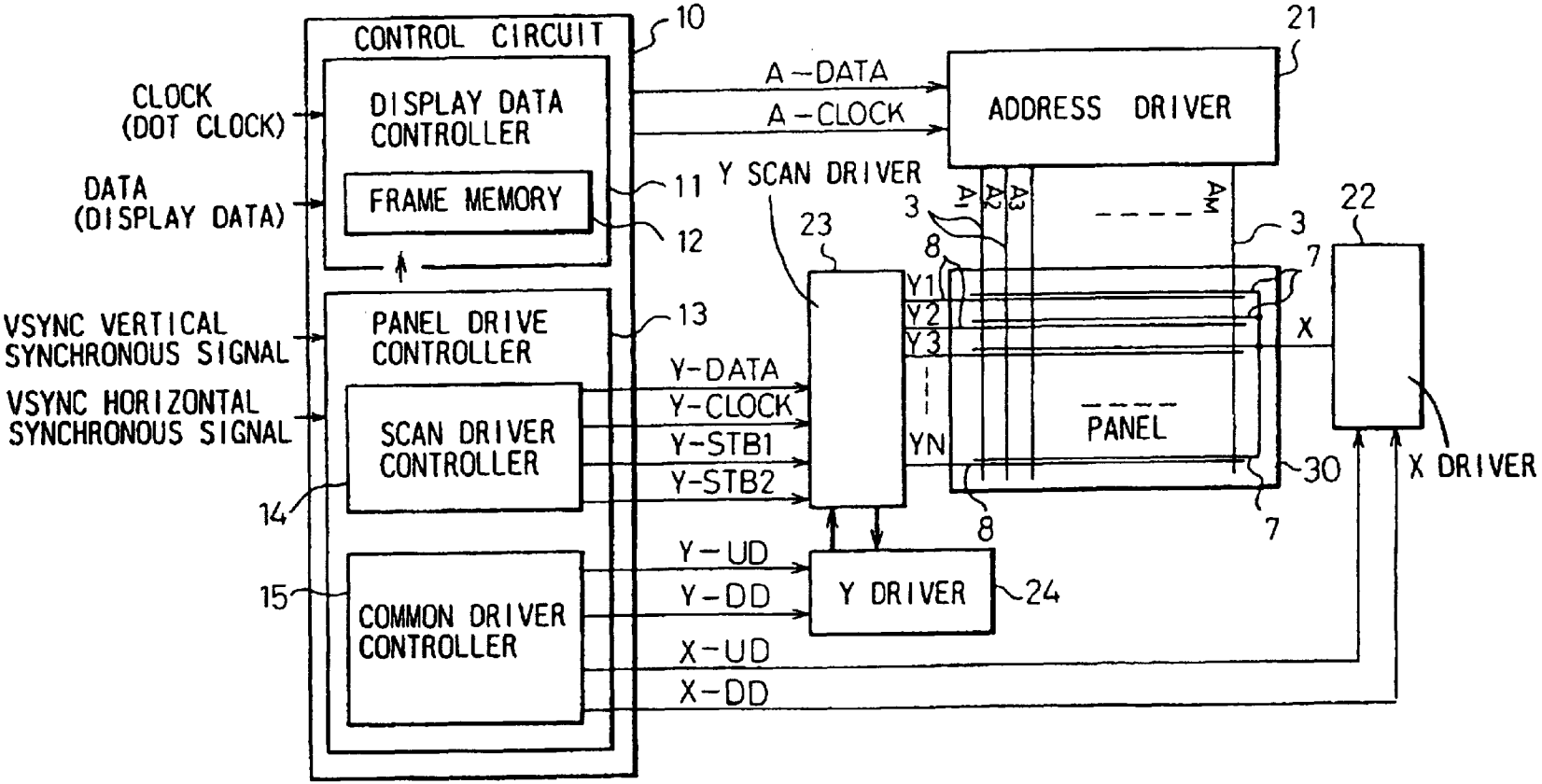
Fig.3 (PRIOR ART)
FIG. 3 is a block diagram showing an example of a three-electrode surface-discharge AC-driven plasma display device using the plasma display panel shown in FIG. 1A.

FIG. 3 is a block diagram showing an example of three-electrode surface-discharge AC-driven plasma display device using a plasma display panel shown in FIG. 1A, and shows peripheral circuits for driving a typical three-electrode AC PDP.

In FIG. 3, reference numeral 10 denotes a control circuit, 11 denotes a display data controller, 12 denotes a frame memory, 13 denotes a panel drive controller, 14 denotes a scan driver controller, and 15 denotes a common drive controller Further, reference numeral 21 denotes an address driver, 22 denotes an X driver, 23 denotes a Y scan driver, 24 denotes a Y driver, and 30 denotes a plasma display panel (PDP). Further, in FIG. 3, reference mark CLOCK denotes a dot clock indicating display data, DATA denotes display data (in case of 256 gray scales, 8 bits for each color: 3×8), VSYNC denotes a vertical synchronizing signal, which indicates the beginning of a frame (one field), and HSYNC denotes a horizontal synchronizing signal.

The control circuit 10 comprise a display data controller 11 and a panel drive controller 13. The display data controller 11 stores display data in the frame memory 12 and transfers the data to the address driver 21 to drive the panel. Note that reference mark A-DATA denotes display data, and A-CLOCK denotes a transfer clock.

The panel drive controller 13 decides when to apply a high voltage wave (pulse) to the panel 30 and is provided with the scan driver controller 14 and the common driver controller 15. Note that reference mark Y-DATA denotes scan data (data for turning ON the Y scan driver 23 every bit), Y-CLOCK denotes a transfer clock (a clock for turning ON the Y scan driver 23 every bit), Y-STB1 denotes a Y strobe-1 (a signal for regulating the timing of turning on the Y scan driver), and Y-STB2 denotes a Y strobe-2. Further, reference mark X-UD denotes a signal (outputs Vs/Vw) for controlling the ON/OFF of the X common driver (22), X-DD denotes a signal (GND) for controlling the ON/OFF of the common driver, Y-UD denotes a signal (outputs Vs/Vw) for controlling the ON/OFF of the Y common driver (24), and Y-DD denotes a signal (GND) for controlling the ON/OFF of the Y common driver.

As shown in FIG. 3, each of the address electrodes 3 is connected to the address driver 21 and gets an address pulse of the address discharge time from the address driver. Further, the Y electrode 8 are individually connected to the Y scan driver, and the Y scan driver 23 is connected to the Y common driver (Y driver 24). The pulse of address discharge time is generated from the Y scan driver 23, and the sustain pulses and others come from the Y driver 24 and are applied to the Y electrodes 8 through the Y scan driver 23. Further, the X electrodes 7 are commonly connected over the display lines of the panel 30, and the X common driver (X driver 22) generates write pulses, sustain pulses, and the like. These driver circuits (21, 22, 23, 24) are controlled by the control circuit 10, which is controlled by synchronous signals, display data signals and others supplied from outside of the device.

Figure 4:
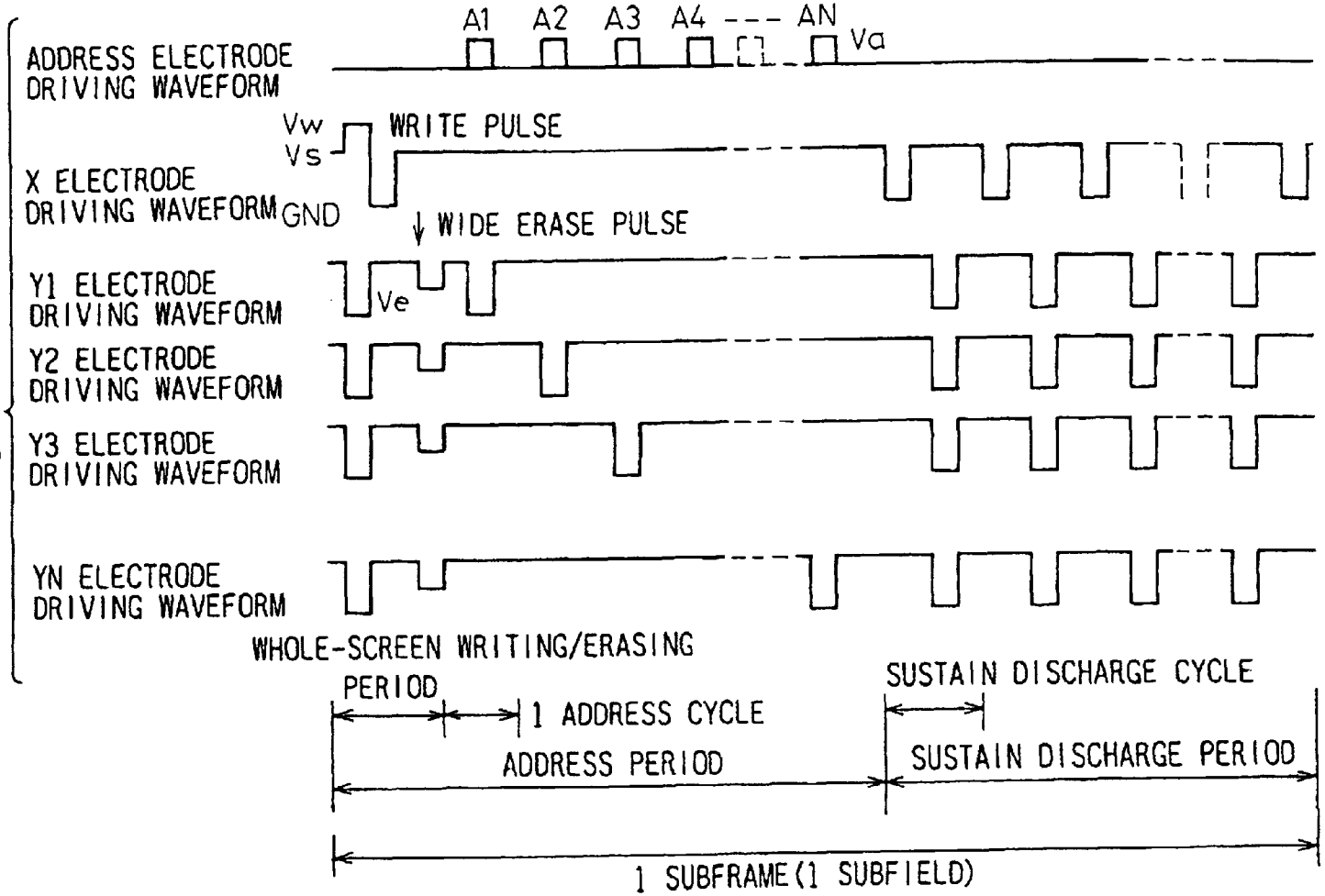
Fig.4 (PRIOR ART)
FIG. 4 is a diagram showing an example of driving waveforms in a plasma display device of FIG. 3.

FIG. 4 is a chart showing an example of driving waveforms in a plasma display device of FIG. 3, that is, FIG. 4 shows driving waveforms of one subframe (or one subfield) in the so-called "address/sustain discharge separated write addressing method". This address/sustain discharge separated write addressing method is, for example, disclosed in Japanese Patent Application No. 3-338342. Note that, in this JPP'342, a driving method intended for low voltage and steady driving (or addressing) is disclosed, and the method is applied to the case when a higher level gray scale technology for a full color display is required As shown in FIG. 4, one subframe is separated into an address period and a sustain discharge period. In the address period, a whole-screen writing, a whole screen erasing and a sequential addressing by writing into a display line (hereinafter, referred to as "line sequential writing (or addressing)") are carried out. Further, in a sustain discharge period, sustain pulses are applied to all of the lines simultaneously, which results in sustain discharges in the cells which write addressing has been executed to and wall charges have been accumulated in. Note that, if a frame consist of two subframes for example by means of interlace (leap over) operation, one subframe corresponds to a subfield in each subframe.

In the above description, one aspect of the driving method shown in FIG. 4 is that the states of all the cells are equalized by whole-screen writing and whole-screen erasing which are carried out at the beginning of the address period and the whole-screen erasing is completed in the state where wall charges available in the subsequent line sequential writing discharge remain.

First, the Y electrodes are brought to the GND level, and at the same time, write pulses of the voltage Vw are applied to the X electrodes causing the whole-screen writing. At this time, ions of positive charges are accumulated to the address electrode, in reality on the surface of dielectric material such as phosphor. Further, in the next step, by applying erasing pulses of the voltage Ve, the whole-screen erasing is carried out. In the erasing discharge, which makes the state in which there is no wall charge on the surface of the dielectric layer (MgO layer) of the X and Y electrodes, it is preferable to accumulate electrons, negative charges advantageous in the next addressing discharge on the MgO surface of Y electrode. Note that the voltage value of the residual wall charges should be at such a level as not to cause the sustain discharge even when sustain discharge pulses are applied to the X and Y electrodes.

After the whole-screen writing and whole-screen erasing intended for the equalization and low voltage operation, a line sequential writing discharge (or addressing discharge) is carried out. In the discharge (discharge operation), the Y electrode of the line to be written is brought to the GND level and an address pulse of the voltage Va is applied to the address electrode of the cell to be written in the line. At this time, the address discharge is possible with a very low voltage because ions and electrons have accumulated on the address side (the surface of the phosphor) and on the Y electrode side (the MgO surface) respectively. After these operations have been executed all over the line, sustain pulses are applied to X and Y electrodes alternately for the sustain discharge.

Figure 5A:
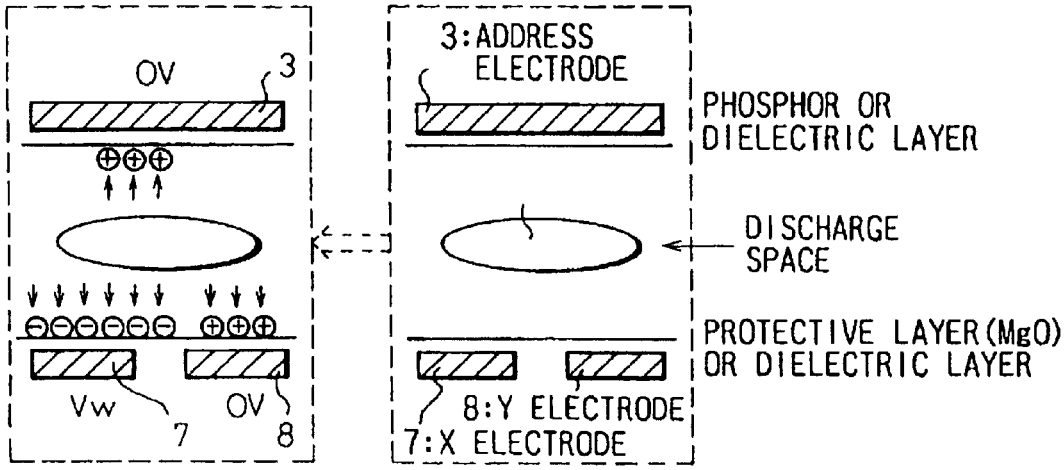
Fig.5A (PRIOR ART)
FIGS. 5A to 5D are diagrams illustrating how cells are driven in the plasma display device of FIG. 3.
Figure 5B:
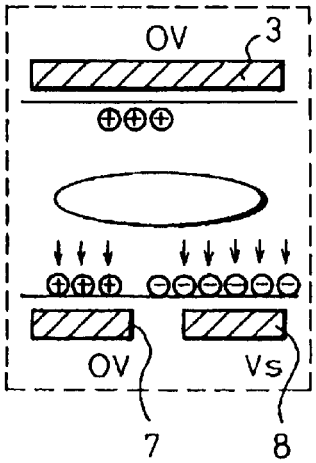
Fig.5B (PRIOR ART)
Figure 5C:
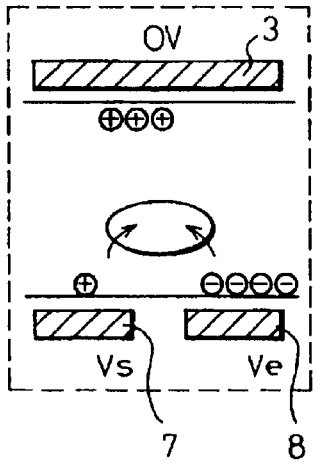
Fig.5C (PRIOR ART)
Figure 5D:
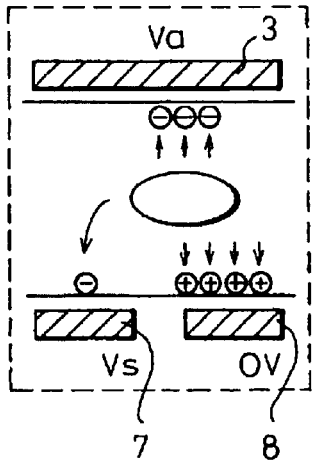
Fig.5D (PRIOR ART)

FIGS. 5A to 5D are diagrams illustrating how cells are driven in the plasma display device of FIG. 3. Namely, FIGS. 5A to 5D show diagrams of the arrangement of charges within a discharge cell and the state of discharge. Namely, FIG. 5A shows the whole-screen (or overall) writing step (positive charges (or ions) have accumulated on the address electrode), FIG. 5B shows the whole-cell sustain discharge step, and FIG. 5C shows the whole-cell erasing step (the wall charge of the sustain discharge electrode is reduced to such a value as not to cause discharge even when sustain discharge voltage (Vs) is applied). Note that, if negative wall charges (electrons) are permitted to remain on the Y electrode, they effectively affect the next address discharge. Further, FIG. 5D shows the selective writing step (address discharge: Writing discharge is done utilizing the wall charge of the address electrode).

First, as shown in FIG. 5A, in the whole-cell writing step, ions are accumulated on the address electrode 3, and ions and electrons are accumulated as wall charges on the X electrode 7 and the Y electrode 8, respectively. Next, as shown in FIG. 5B, in the whole-cell sustain discharge step, the ions of the address electrode 3 are left as they are and the sustain discharge between the X electrode 7 and the Y electrode 8 causes the inversion of charges. Further, as shown in FIG. 5C, in the whole-cell erasing step, the ions of the address electrode 3 are left as they are and the erasing discharge between the X electrode 7 and the Y electrode 8 reduces the wall charges to such a value as not to cause sustain discharge even when sustain discharge pulses of the voltage Vs is applied.

Further, as shown in FIG. 5D, in the selective writing step, a line sequential selective writing discharge (or addressing discharge) is carried out. Though the voltage applied at this time from the electrode is not more than the voltage Va of address pulses applied to the address electrode 3, the selective writing discharge (or addressing discharge) can be executed surely and steadily with a low address voltage Va because of the voltage owing to the wall charges which have been produced until the whole-cell erasing step. Namely, the voltage on the ions of the address electrode 3 and the electrons of the Y electrode 8 functions accumulatively with the address voltage Va.

Therefore, "the address/sustain discharge separated addressing method" is used in cases when there are many scan lines (or display lines) or when a higher level gray scale is used for full color display. This method is, for example, disclosed in Japanese Unexamined Patent Publication (Kokai) No. 4-195188. Further, the driving method in case of the 16 gray scales is shown as an example of a high gray level display in FIG. 6.

Figure 6:
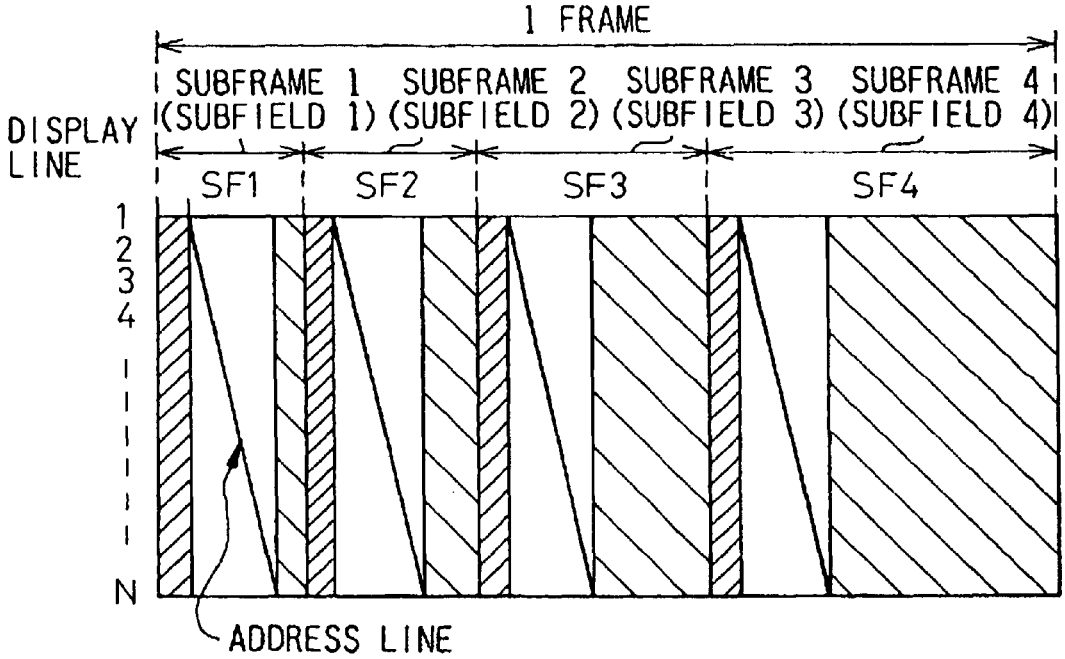
Fig.6 (PRIOR ART)
FIG. 6 is a timing chart showing an example of a driving operation for the plasma display device of FIG. 3.

FIG. 6 shows timing chart for driving the plasmas display device of FIG. 3, and shows the driving method in case of the 16 gray scales. In the driving method as shown in FIG. 6, one frame is divided into four subframes (or subfields) SF1, SF2, SF3, and SF4. In these subframes, the address periods Ta1, Ta2, Ta3, and Ta4 including the whole-screen writing periods Tw1, Tw2, Tw3, and Tw4 are of the identical length (time). Further, the lengths (periods of time) of the sustain discharge periods Ts1, Ts2, Ts3, and Ts4 are of the rate 1:2:4:8. Therefore, it is possible to display in 16 scales of brightness from 0 to 15 by selecting subframes to be lightened.

As described above, in an AC PDP, a frame which forms an image (picture) consists of some sheets of subframes different in brightness from each other. The luminous brightness of each subframe is decided by the number of sustain discharge per unit time. Ideally, the brightness has a linear relationship with the number of sustain discharges. Therefore, the method in which the number of sustain discharge pulses of any subframe is half of that of the subframe next brighten than the formed is the best.

Further, the Japanese Patent Application No. 4-281459 "The Driving Method Relating to The Adjustment of Brightness of A Plasma Display Panel" has been filed at the Japanese Patent Office. According to the invention of JPP'459, for example, in the case of the 16 gray scales, 4 subframes are required. The number of sustain discharge pulses within each Vsync is, if 80 pulses in the SF (SF4) of the maximum brightness, 40 pulses in subframe SF3, 20 pulses in subframe SF2, and 10 pulses in subframe SF1.

Figure 7:
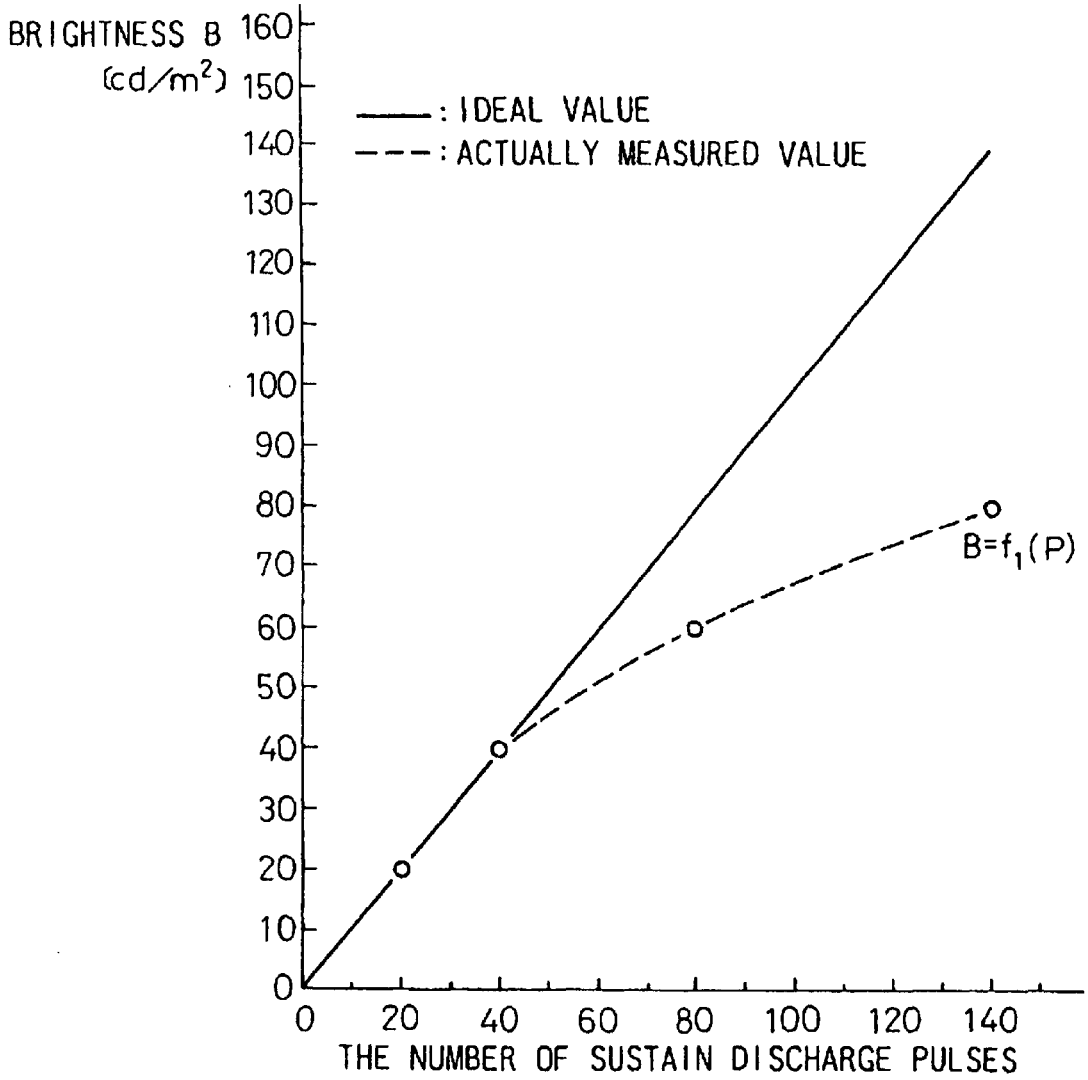
Fig.7 (PRIOR ART)
FIG. 7 is a diagram showing problems in the conventional gray scale controlling method of a plasma display device.

FIG. 7 is a diagram illustrative of the problems in the conventional gray scale controlling method of a plasma display device, and shows the relationship between the number of sustain pulses and the brightness.

As shown in a solid line in FIG. 7, ideally, the brightness should be in linear relationship with the number of sustain discharges. If so, the relationship of the brightness with respect to the gray level (or the value of gray scale) is also linear.

However, as shown in a dashed line in FIG. 7, in actual displays, the relationship of the brightness with respect to the number of sustain discharges is not linear, but curved. Accordingly, the relationship of the brightness with respect to the gray level is also not linear, which results in remarkable degradation of the display quality. Such a problem is becoming significant with the requirement of an increase in the gray scale number in recent years. As to higher level gray scale display such as the 64 gray scales, the above mentioned degradation of the display quality becomes a serious problem.

Below, embodiments of a method and an apparatus for controlling the gray scale of a plasma display device according to the present invention will be explained with reference to the drawings.

Figure 8:
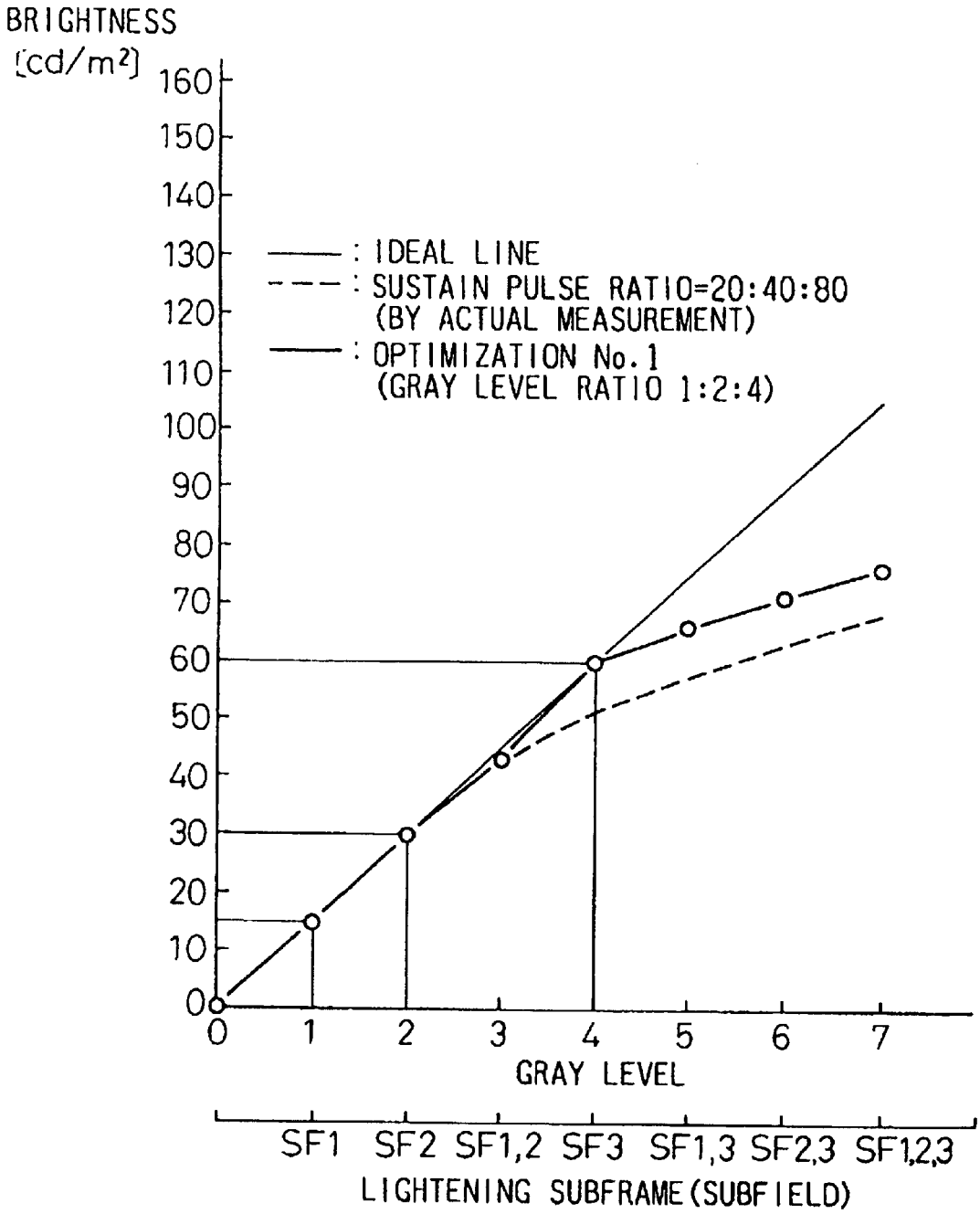
FIG. 8 is a diagram for explaining an embodiment of a gray scale controlling method for a plasma display device according to the present invention.

FIG. 8 shows an embodiment of a gray scale controlling method for a plasma display device according to the present invention. In FIG. 8, the axis of ordinates indicates the brightness B |cd/m×m|, the axis of abscissas indicates the gray level.

Note that, in each of the following embodiments, the gray level 0 corresponds to the case when no sustain emission is done in any subframe (or subfield) SF1 through SF3, the gray level 1, 2 and 4 correspond to the case when sustain emissions of only one subframe SF1, SF2, or SF3 are done, the gray level 3, 5, and 6 correspond to the case when sustain emissions of two subframes SF1 and SF2, SF1 and SF3, or SF2 and SF3 are done, and the gray level 7 corresponds to the case when sustain emissions of all the subframes SF1 through SF3 are done.

$$B=f_1(P) \tag{1}$$

$$B=f_2(K) \tag{2}$$

$$f_1(P3)=2\times f_1(P2)=4\times f_1(P1) \tag{3}$$

$$P1<P2<P3 \tag{4}$$

$$b_1=f_1(P1)-f_2(1) \tag{5}$$

$$b_2=f_1(P2)-f_2(2) \tag{6}$$

$$b_3=f_1(P1+P2)-f_2(3) \tag{7}$$

$$b_4=f_1(P3)-f_2(4) \tag{8}$$

$$b_5=f_1(P1\ P3)-f_2(5) \tag{9}$$

$$b_6=f_1(P2+P3)-f_2(6) \tag{10}$$

$$b_7=f_1(P1+P2+P3)-f_2(7) \tag{11}$$

$$B = f_1(P) \tag{1}$$

$$B = f_2(K) \tag{2}$$

$$f_1(P3) = 2\times f_1(P2) = 4\times f_1(P1) \tag{3}$$

$$P1 < P2 < P3 \tag{4}$$

$$b_1 = f_1(P1) - f_2(1) \tag{5}$$

$$b_2 = f_1(P2) - f_2(2) \tag{6}$$

$$b_3 = f_1(P1 + P2) - f_2(3) \tag{7}$$

$$b_4 = f_1(P3) - f_2(4) \tag{8}$$

$$b_5 = f_1(P1P3) - f_2(5) \tag{9}$$

$$b_6 = f_1(P2 + P3) - f_2(6) \tag{10}$$

$$b_7 = f_1(P1 + P2 + P3) - f_2(7) \tag{11}$$

$$bS1 = \sum_{k=1}^{7} (b_1^2) \tag{12}$$

$$bS2 = \sum_{k=1}^{7} |b_k| \tag{13}$$

$$Pn > \sum_{k=1}^{n-1} Pk \tag{14}$$

First, the brightness B of a panel is measured for some numbers P of sustain discharge pulses to get actually measured values in a gray scale-brightness characteristic as shown in FIG. 7, and the resultant curve is made B=f1(P) of the equation (1). In the prior art, the number of sustain emissions in each subframe is so set that the number of pulses in an arbitrary subframe is two times the number of pulses in the subframe next brighter than the former. However, in this embodiment, the number of sustain emissions in each subframe is so set that the brightness of an arbitrary subframe is two times the brightness of the subframe next brighter than the former.

A case of optimization according to the embodiment will be shown exemplifying the actually measured values in the gray scale-brightness characteristic shown in FIG. 7. Assuming the brightness of subframe SP3 to be 60 cd/m×m, the brightness of subframe SF2 is half of 60. 30 cd/m×m, the brightness of subframe SF1 is half of 30. 15 cd/m×m. In this case the numbers of sustain discharge pulses for each gray level are as set forth in Table 1 below.

TABLE 1

| GRAY LEVEL | 0 | 1 | 2 | 3 | 4 | 5 | 6 | 7 |
|---|---|---|---|---|---|---|---|---|
| BRIGHTNESS Cd/m$^2$ | 0 | 15 | 30 | 43 | 60 | 66 | 71 | 76 |
| NUMBER-OF SUSTAIN DISCHARGE PULSES | 0 | 15 | 30 | 45 | 80 | 95 | 110 | 125 |

In FIG. 8, a dashed line indicates the relation before the optimization, a fine solid line indicates the relation after the optimization, and a thick solid line indicates an ideal line.

The embodiment shown in FIG. 8 has an advantage that it does not need complex calculations, but lacks linearity in higher gray levels when the linearity of the brightness B of the pane with respect to the number P of sustain discharge pulses is low. Namely, the numbers of sustain emissions of each subframe are like a geometric series (1, 2, 4, 8, . . .) in the conventional gray scale controlling method, whereas the numbers of sustain emissions of each subframe is set on the basis of the brightness of the each subframe in the inventive gray scale controlling method for the plasma display device. Therefore, the numbers of sustain emissions of each subframe are not like a geometric series in the inventive gray scale controlling method for a plasma display device. Namely, the number of sustain emissions in each subframe is set in an anti-geometrical progression, or the number of sustain emissions in each subframe is not determined in accordance with any mathematical relationship.

Figure 9:
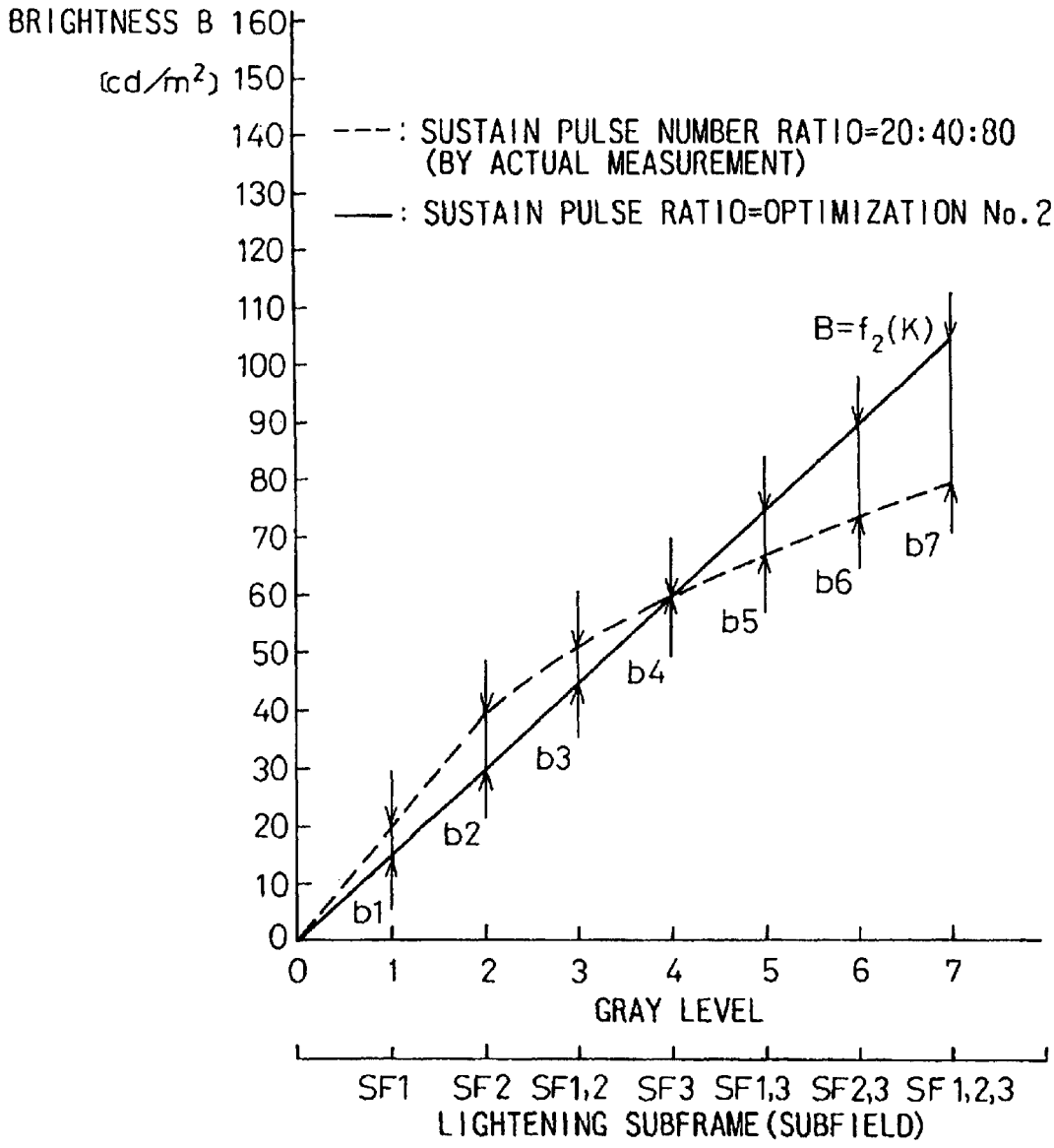
FIG. 9 is a diagram for explaining another embodiment of a gray scale controlling method for a plasma display device according to the present invention.
Figure 10:
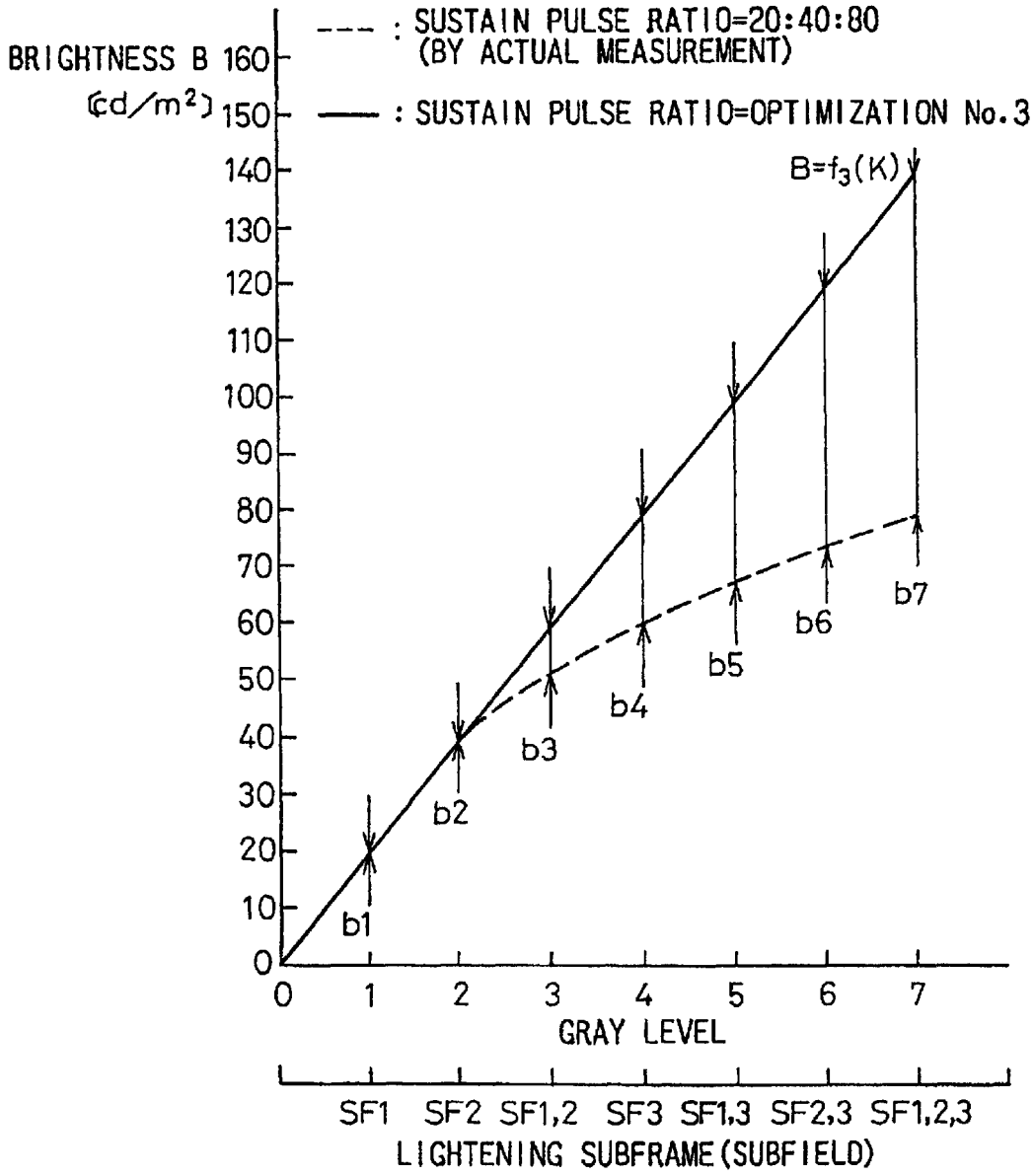
FIG. 10 is a diagram for explaining still another embodiment of a gray scale controlling method for a plasma display device in accordance with the invention.

FIG. 9 shows another embodiment of a gray scale controlling method for a plasma display device in accordance with the invention, and FIG. 10 is a diagram for explaining still another embodiment of a gray scale controlling method for a plasma display device in accordance with the invention. In FIGS. 9 and 10, the axis of ordinates indicates the brightness B |cd/m×m|, the axis of abscissas indicates the gray level.

As shown in FIG. 9, in this embodiment the target line of the brightness B for gray levels is set to B=f2(K) of the equation (2). Note that, assuming the difference between a calculated brightness and a target brightness in a certain gray level X in a certain sustain pulse number ratio to be bx, it is possible to find the numbers (P1, P2, P3) of sustain pluses of each subframe, for examples in the 8 gray scales in the following procedure.

The optimum numbers of sustain pulses are such, P1, P2, and P3, as to minimize bS1 in the equation (12) which satisfies the conditions of the equations (4) to (11) when the equation (1) is obtained first by actual measurement and the equation (2) is set. In other words, in order to make the relation between the gray level and the corresponding brightness a linear relation, the numbers of sustain emissions of each subframe in the case when the sum of the squares of errors in each gray level with respect to the ideal values becomes minimum is calculated on the basis of data of the brightness actually measured for the numbers of sustain emissions. In the embodiment shown in FIG. 9, the calculations are complex as compared with the embodiment shown in FIG. 8, but a result very close to optimum can be found.

It should be noted that though the numbers of sustain emissions of each subframe in the case when the sum of the squares of errors in each gray level with respect to the ideal values becomes minimum is calculated in the equation (12), by using the equation (13) instead of the equation (12), it is possible to calculate the numbers of sustain emissions of each subframe in the case when the sum of the absolute values of errors in each gray level with respect to the ideal values becomes minimum. In other words, in order to make the relation between the gray level and the corresponding brightness a linear relation, the numbers of sustain emissions of each subframe in the case when the sum of the absolute values of errors in each gray level with respect to the ideal values becomes minimum is calculated on the basis of data of the brightness actually measured for the numbers of sustain emissions.

When the equation (12) or (13) is used, there is the possibility of bringing about the situation in which for the brightness of an arbitrary gray level, the brightness of the gray level next larger than the former exceeds that of the former. In order to avoid this, the condition of equation (14) is added. The equation (14) indicate that the number of pulses of an arbitrary subframe exceeds the sum of the numbers of the pulses of the subframes which have less pulses than the former subframe. That is, it is possible to make such arrangement that for the brightness of the first subframe with an arbitrary gray levels the brightness of the second subframe which has a next larger gray level than the first subframe never exceeds that of the first subframe.

Further, in order to obtain higher brightness, the number of sustain pulses of each subframe may be increased. However, the number of sustain pulses which can be included in a limited time within a vertical synchronous period has a limitation. Thus, if the sum (P1+P2+P3) of the numbers of pulses within a vertical synchronous signal or the number (P3) of pulses of the highest level subframe is first set, and then, P1, P2 and P3 in the case when bS1 of the equation (12) or bS2 of the equation (13) which satisfies the conditions of the equations (4) to (11) becomes minimum are found, then they are the optimum number of sustain pulses. In this case there is no need for setting B=f2(K) of the equation (2). Note that the number of pulses of SF3 is set for 60 in the embodiment in FIG. 9. That is, an arrangement may be so made that the sum of the numbers of sustain emissions of one or two subframes in a plurality of subframes, or the sum of the numbers of sustain emissions of two or three subframes is specified. Note that, when the number of the subframes is increased, the number of the subframes to be specified is increased.

Next if there is a sufficiently long vertical synchronous period as shown in FIG. 10 and the target maximum brightness needs to be set, the maximum brightness f1(P1+P2+P3) is first set, and then P1, P2 and P3 in the case when bS1 of the equation (12) or bS2 of the equation (13) which satisfies the conditions of the equations (3) to (10) becomes minimum are found, the resultant values being the optimum number of sustain pulses. In this case, B=f2(K) of the equation (2) need not be set. Note that, in the embodiment of FIG. 10, the brightness of the gray level 7 is set for 140 cd/m×m. Namely, an arrangement may be so made that the brightness of the subframe with the maximum gray level is specified.

Using the optimum number of sustain discharge pulses found through each method as described above, the driving operation described below will be carried out.

Figure 11A:
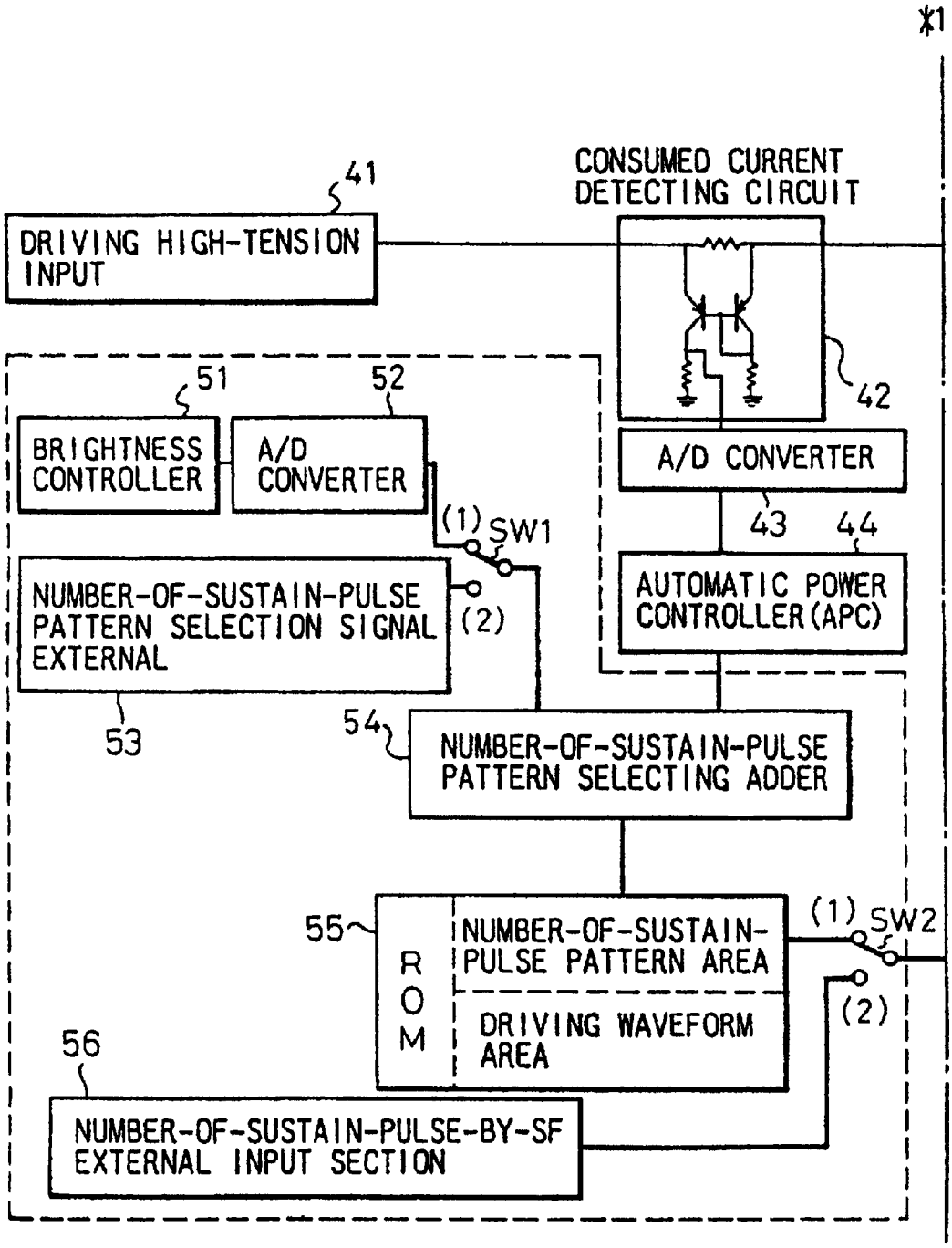
FIG. 11 consisting of FIGS. 11A and 11B, is a block diagram showing an embodiment of a plasma display device to which a gray scale controlling method for a plasma display device according to the present invention is applied.
Figure 11B:
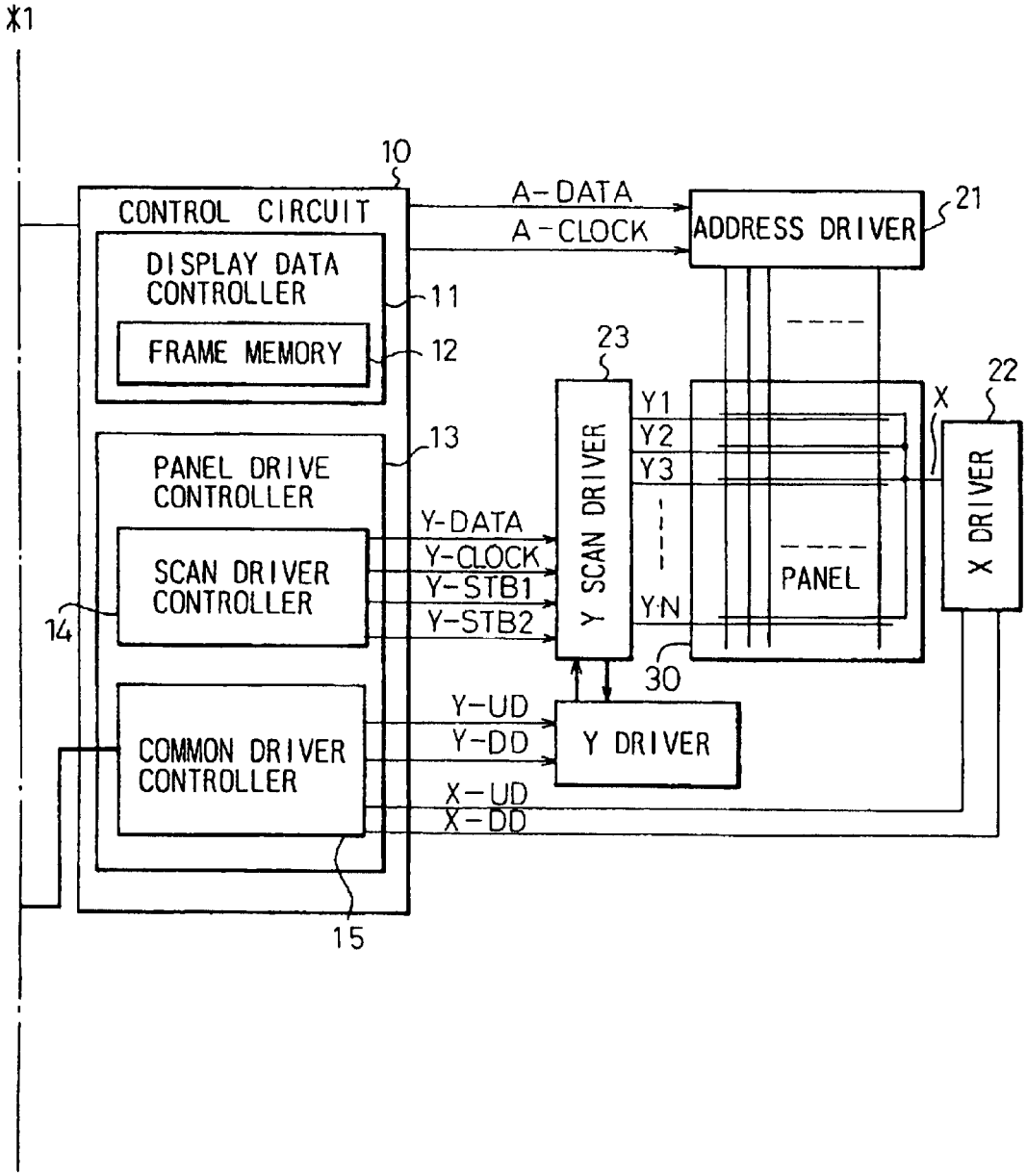

FIGS. 11A and 11B are block diagrams showing an embodiment of a plasma display device to which the inventive gray scale controlling method for a plasma display device is applied. In FIGS. 11A and 11B (FIG. 11B), reference numeral 10 denotes a control circuit, 11 denotes a display data controller, 12 denotes a frame memory, 13 denotes a panel drive controller, 14 denotes a scan driver controller, and 15 denotes a common driver controller. Further, reference numeral 21 denotes an address driver, 22 denotes a X driver, 23 denotes a Y scan driver, and 30 denotes a plasma display panel (PDP). These components are identical to those shown in FIG. 3, so explanations will be omitted.

In FIGS. 11A and 11B, reference numeral 41 denotes a high-tension input for driving, 42 denotes a consumed current detecting circuit, 43 denotes an A/D converters and 44 denotes an automatic power controller (APC). Further, reference numeral 51 denotes a brightness controller, 52 denotes an A/D converter, 53 denotes a number-of-sustain-pulse pattern selection signal external input section, 54 denotes a number-of-sustain-pulse pattern selection adder, 55 denotes a ROM (read only memory), and 56 denotes a number-of-sustain-pulse-by-SF external input section. Also, reference marks SW1 and SW2 denote selection switches.

The data of the numbers of sustain discharge pulses which are calculated through the above described gray scale controlling method for a plasma display device (the optimum number-of-sustain-emission calculating method) are stored in ROM 55. The data of the number of sustain discharge pulses which are output from ROM 55 are supplied to the common driver controller 15 in the control circuit 10, which output control signals for sustain discharge pulses of each subframe by a specified number from ROM 55 in a prescribed timing to the X driver 22 and Y driver 24. The X driver 22 and Y driver 24 output high-tension panel driving pulses on the basis of the control signals supplied from the control circuit 10. That is, the numbers of sustain emissions in each subframe are set in ROM 55 and are read therefrom as the occasion demands.

In this case, making good use of a vacant area in ROM which had been used for driving waveforms, instead of adding new ROM, will contribute to cost reduction and saving of the mounting area. In other words, a memory for setting and storing the numbers of sustain emissions in each subframe can be constituted by the vacant area of the driving waveform memory device 55 in the plasma display device.

Furthermore, if the data of the numbers of sustain discharge pulses are calculated and set not only in one kind of pattern but in a plurality of kinds of patterns different in relative brightness using the equations (12) and (13), it becomes possible to adjust the brightness keeping a constant gray scale display. Brightness information set by the brightness controller 51 is converted by the A/D converter 52 into a digital signal, which serves as ROM address signal and selects number-of-sustain-emission data. That is, an arrangement can be so made that one piece is selected by the brightness controller 51 out of information about the numbers of sustain emissions of each subframe which is set in ROM. This enables the user to adjust the brightness to the operating circumstance of the device.

In this case, by shifting the points of contact of the selection switch SW1 from (1) to (2), information from an external device instead of information by the brightness controller 51 can be let in via a number-of-sustain-pulse pattern selection signal external input section 53. Further, information on the number of sustain emissions of a frame may be set as a plurality of combinations in ROM 55, and any one among the plurality of combinations may be selected by means of selection signals supplied from outside of the plasma display device. This enables the remote control of brightness adjustment and so forth.

Further, in the present plasma display device, since the consumed current varies greatly depending on brightness and a display rate, the power supplying route is provided with a consumed current detecting circuit 42 using well known technology, so that the consumed current is controlled and limited to below the set value by limiting the brightness when the consumed current exceeds a prescribed value because of the increase of a display rate and the like. By adding the output of automatic power controller (consumed current controller means) 44 for controlling the consumed current in the number-of-sustain-pulse pattern selecting adder and writing the result in ROM 55, it becomes possible to achieve smooth gray scale control limiting the consumed current to below a certain value. Namely, it is possible to make the consumed power constant regardless of the change of a display rate.

The above described plasma display device is so arranged that each control is achieved on the basis of information in ROM (55) provided within the main body of the plasma display device. By the way, the life span of a plasma display device is generally defined as halving of brightness. For example, when it is desirable to do higher level gray scale control from the outside of the unit in order to cope with such a phenomenon, shifting the points of contact of the selection switch SW2 from side (1) to side (2) enables the external input of the number of sustain pulses by subframe (or subfield), and eventually enables real-time alteration of the number of sustain discharge pulses.

In the above description, a surface-discharge AC plasma display device with a three-electrode structure has been described in detail as an example to which the inventive gray scale controlling method for a plasma display device is applied. However, it should be noted that in addition to the three-electrode surface-discharge AC plasma display device (with reference to FIGS. 1A and 1B), the present invention can be applied to, for example, a two-electrode facing-discharge plasma display device (with reference to FIGS. 2A and 2B) and other plasma display devices.

As described above, according to a gray scale controlling method for a plasma display device of the present invention, the number of sustain emissions in each subframe is set individually by each subframe. This establishes a linear relation between the gray level and the corresponding brightness and enables the enhancement of display quality of the plasma display device.

Many different embodiments of the present invention may be constructed without departing from the spirit and scope of the present invention, and it should be understood that the present invention is not limited to the specific embodiments described in this specification, except as defined in the appended claims.

What is claimed is:

1. A method of controlling [the] *a* gray scale of a plasma display device, wherein said method comprises the steps of:

forming a frame for an image by a plurality of subframes each having a specific weight value;

calculating *numbers of sustain emissions of said plurality of subframes so as to make* a ratio of brightness of said plurality of subframes [so as to] substantially [correspond with] *equal* a ratio of the *specific* weight values of said plurality of subframes, wherein a ratio of numbers of sustain emissions of said plurality of subframes does not equal the ratio of the *specific* weight values of said plurality of subframes; and displaying the image on said plasma display device by optionally combining said subframes each having the calculated number of the sustain emissions.

2. A method of controlling [the] *a* gray scale of plasma display device as claimed in claim 1, wherein the number of sustain emissions of said each subframes is so calculated, that the brightness obtained by one subframe of said plurality of subframes having an arbitrary brightness is twice the brightness obtained by another subframe of said plurality of subframes having a brightness next to that of said one subframe.

3. A plasma display device comprising at least one pair of electrodes for carrying out a discharge operation, wherein:

said plasma display device is driven *by* separating address periods in which display data are written *in a common period for each display line* in the screen[, said display data is] *so as to accumulate wall charges* necessary for sustain discharge from sustain discharge periods in which sustain discharge for light emission is repeated *in a common period for each display line*, one frame forming an image is constituted by a plurality of subframes each having a specific weight value, *numbers of sustain emissions of said plurality of subframes are calculated so at to make* a ratio of brightness of said plurality of subframes [is calculated so as to] substantially [correspond with] *equal* a ratio of the *specific* weight values of said plurality of subframes, wherein a ratio of numbers of sustain emissions of said plurality of subframes does not equal to the ratio of the *specific* weight values of said plurality of subframes, and the image is displayed on said plasma display device by optionally combining said subframes each having the calculated number of the sustain emissions.

4. A plasma display device as claimed in claim 3, wherein said plasma display device is a three-electrode plasma display device.

5. A plasma display device as claimed in claim 4, wherein said three-electrode plasma display device is a three-electrode surface discharge AC plasma display device.

6. A plasma display device as claimed in claim 4, wherein said three-electrode plasma display device comprises:

first and second electrodes arranged in parallel with each other; and third electrodes orthogonal to said first and second electrodes, said first electrode being commonly connected together, and said second electrodes being arranged for display lines, respectively, wherein said display device has a surface discharge structure employing wall charges as memory media.

7. A plasma display device as claimed in claim 6, wherein said three-electrode plasma display device further comprises:

a first substrate, and said first and second electrodes being arranged in parallel with each other on said first substrate and paired for respective display lines;

a second substrate spaced apart from and facing said first substrate, and said third electrodes being arranged on said second substrate away from and orthogonal to said first and second electrodes;

a wall charge accumulating dielectric layer covering the surfaces of said first and second electrodes and said first substrate;

a phosphor formed over said third electrodes and said second substrate;

a discharge gas sealed in a cavity defined between said first and second substrates; and cells formed at intersections where said first and second electrodes cross said third electrodes.

8. A plasma display device as claimed in claim 3, wherein said plasma display device is a two-electrode plasma display device.

9. A plasma display device as claimed in claim 8, wherein said two-electrode plasma display device is a two-electrode facing-discharge AC-driven plasma display panel.

10. A plasma display device as claimed in claim 8, wherein said two-electrode plasma display device comprises:

a plurality of first electrodes; and a plurality of second electrodes orthogonal to said first electrodes, and said first electrodes being arranged for display lines, respectively wherein said display device has a surface discharge structure employing wall charges as memory media.

11. A plasma display device as claimed in claim 10, wherein said two-electrode plasma display device further comprises:

a first substrate, [and] said first electrodes being arranged in parallel on said first substrate;

a second substrate spaced apart from and facing said first substrate, and said second substrate being arranged on said second substrate away from and orthogonal to said first electrodes;

a wall charge accumulating dielectric layer covering the surfaces of said first electrodes and said first substrate;

a phosphor formed over said second electrodes and said second substrate;

a discharge gas sealed in a cavity defined between said first and second substrates; and cells formed at intersections where said first electrodes cross said second electrodes.

12. A plasma display device as claimed in claim 3, wherein said plasma display device further comprises a memory for setting and storing the number of sustain emissions in each subframe, and information on the number of sustain emissions in said search subframe is read at any time from said memory.

13. A plasma display device as claimed in claim 12, wherein said memory is constituted by a vacant area of a driving wave-form memory device in said plasma display device, and the information on the number of sustain emissions in said each subframe is set in the vacant area of said driving wave-form memory device.

14. A plasma display device as claimed in claim 12, wherein said plasma display device further comprises a brightness controller for adjusting the brightness, and aid brightness controller selects one piece from the information on the number of sustain emissions in said each subframe set in said memory.

15. A plasma display device as claimed in claim 12, wherein the number of sustain emissions in said each subframe is set as a plurality of combinations in said memory, and an arbitrary one of said plurality of combinations is selected by selection signals supplied from the outside of said plasma display device.

16. A plasma display device as claimed in claim 12, wherein said plasma display device further comprises a consumed current controller for controlling and keeping the consumed current below a predetermined value, the number of sustain emissions in said each subframe is set as a plurality of combinations in said memory, an arbitrary one of said plurality of combinations is selected in response to the output from said consumed current controllers and thereby the power consumption is keep constant regardless of the change of display rate.

17. A plasma display device as claimed in claim 12, wherein the information on the number of sustain emissions in said each subframe is supplied from the outside of said plasma display device.

18. A method of controlling [the] *a* gray scale of a plasma display device, wherein said method comprises the steps of:

forming a frame for an image by a plurality of subframes each having a specific weight value; and displaying the image on said plasma display device by optionally combining gray levels of said plurality of subframes, wherein [each gray level] numbers of sustain emissions of said plurality of subframes are calculated so as to make a ratio of brightnesses of [each gray level] *said plurality of subframes* [is calculated so at to] substantially [correspond with] *equal* a ratio of [the specific weight values of each gray level] *the specific weight values of said plurality of subframes* and *a* ratio of numbers of sustain emissions of [each gray level] said plurality of subframes does not equal the ratio [of the specific weight values] of [each gray level] the specific weight values of said plurality of subframes.

19. A method of controlling [the] *a* gray scale of a plasma display device as claimed in claim 18, wherein the number of sustain emissions of said each subframe is so calculated, that [the] *a* sum of the squares of errors with [the] ideal values in said each gray level becomes *a* minimum, in order to make [the] *a* relation between [the] *said each* gray level and [the] corresponding brightness linear.

20. A method of controlling [the] *a* gray scale of a plasma display device as claimed in claim 19, wherein [the] *a* brightness of one subframe of said plurality of subframes having *a* next larger gray level than that of another subframe of said plurality of subframes does not exceed [the] *a* brightness of said another subframe, for the brightness of said another subframe having said arbitrary gray level.

21. A method of controlling [the] *a* gray scale of a plasma display device as claimed in claim 19, wherein [the] *a* sum of the numbers of sustain emissions of several subframes in said plurality of subframes is specified.

22. A method of controlling [the] *a* gray scale of a plasma display device as claimed in claim 19, wherein [the] *a* brightness of an optional subframe is specified in said plurality of subframes.

23. A method of controlling [the] *a* gray scale of a plasma display device as claimed in claim 18, wherein [the] *a* number of sustain emissions of said each subframe is so calculated, that [the] *a* sum of the absolute values of errors with [the] ideal values in said each gray level becomes *a* minimum, in order to make [the] *a* relation between [the] *said each* gray level and [the] corresponding brightness linear.

24. A method of controlling [the] *a* gray scale of a plasma display device as claimed in claim 23, wherein [the] *a* brightness of one subframe of said plurality of subframes having *a* next larger gray level than that of another subframe of said plurality of subframes does not exceed [the] *a* brightness of said another subframe, for the brightness of said another subframe having said arbitrary gray level.

25. A method of controlling [the] *a* gray scale of a plasma display device as claimed in claim 23, wherein [the] *a* sum of the numbers of sustain emissions of several subframes in said plurality of subframes is specified.

26. A method of controlling [the] *a* gray scale of a plasma display device as claimed in claim 23, wherein [the] *a* brightness of an optional subframe is specified in said plurality of subframes.

27. A plasma display device comprising at least one pair of electrodes for carrying out a discharge operation, wherein:

said plasma display device is driven *by* separating address periods in which display data are written *in a common period for each display line* in [the] *a* screen[, said display data is] *so as to accumulate wall charges* necessary for sustain discharge from sustain discharge periods in which sustain discharge for light emission is repeated *in a common period for each display line*, one frame forming an image is constituted by a plurality of subframes each having a specific weight value, and an image on said plasma display device is displayed by optionally combining gray levels of said plurality of subframes, wherein [each gray level ] numbers of sustain emissions of said plurality of subframes are calculated so as to make a ratio of brightness of [each gray level is calculated so as to] *said plurality of subframes* substantially [correspond with] *equal* a ratio of [the specific weight values ofeach gray scale] *the specific weight values of said plurality of subframes*, and a ratio of numbers of sustain emissions of [each gray level ] said plurality of subframes does not equal the ratio of [the specific weight values of each gray level] *the specific weight values of said plurality of subframes*.

*28. A method of controlling a gray scale of a plasma display device, wherein said method comprises:*

*forming a frame for an image by a plurality of subframes having respective, predetermined brightnesses;*

*setting a number of sustain emissions, individually for and corresponding to the predetermined brightness of each individual subframe, numbers of sustain emissions of different subframes bearing a non-linear relationship to the different, predetermined brightnesses of the respective, different subframes; and*

*displaying the image on said plasma display device in accordance with selected subframes to produce a gray scale display of a specific brightness.*

*29. A method of controlling a gray scale of a plasma display device as claimed in claim 28, further comprising:*

*setting numbers of sustain emissions for respective subframes to establish a linear relationship between respective gray levels and corresponding brightnesses of different subframes.*

*30. A method of controlling a gray scale of a plasma display device as claimed in claim 28, further comprising:*

*setting the number of sustain emissions for respective subframes in a pattern in a memory accessible by a brightness controller.*

*31. A method of controlling a gray scale of a plasma display device as claimed in claim 30, further comprising:*

*setting plural said patterns having respective, different relative brightnesses in the memory accessible by the brightness controller; and*

*selecting among the patterns to thereby adjust the brightness of the display of the image.*

*32. A method of controlling a gray scale of a plasma display device as claimed in claim 28, wherein the setting is performed by a calculation whereby the brightness obtained by one subframe of the plurality of subframes having an arbitrary brightness is twice the brightness obtained by another subframe of the plurality of subframes having a brightness next to that of the one subframe.*

*33. A method of controlling a gray scale of a plasma display device as claimed in claim 28, further comprising:*

*setting the number of sustain emissions of each subframe such that the sum of the squares of errors with ideal values in each gray level becomes a minimum and thereby to make the relation between the gray level and the corresponding brightness linear.*

*34. A method of controlling a gray scale of a plasma display device as claimed in claim 28, wherein the number of sustain emissions is set so that the brightness of one subframe of the plurality of subframes having a next larger gray level than that of another subframe of the plurality of subframes does not exceed the brightness of the another subframe, for the brightness of the another subframe having the arbitrary gray level.*

*35. A method of controlling a gray scale of a plasma display device as claimed in claim 28, further comprising:*

*setting the number of sustain emissions of each subframe such that the sum of the absolute values of errors with the ideal values in each gray level becomes a minimum in order to make the relation between the gray level and the corresponding brightness linear.*

*36. A method of controlling a gray scale of a plasma display device as claimed in claim 28, wherein the number of sustain emissions of each subframe is set in an anti-geometrical progression corresponding to the predetermined brightness of each subframe of the plurality of subframes.*

*37. An apparatus controlling a gray scale of a plasma display device in which a frame for an image is formed by a plurality of subframes having respective, predetermined brightnesses, comprising:*

*a memory having set therein a number of sustain emissions individually for, and corresponding to, the predetermined brightness of each individual subframe, numbers of sustain emissions of different subframes bearing a non-linear relationship to the different predetermined brightnesses of the respective, different subframes; and*

*a controller displaying the image on said plasma display device in accordance with selected subframes to produce a gray scale display of a specific brightness.*

*38. The apparatus as claimed in claim 37, further comprising:*

*the memory having set therein numbers of sustain emissions for respective subframes to establish a linear relationship between the respective gray levels and corresponding brightnesses of the different subframes.*

*39. The apparatus as claimed in claim 37, further comprising:*

*the memory having set therein the number of sustain emissions for respective subframes in a pattern in a memory accessible by a brightness controller.*

*40. The apparatus as claimed in claim 39, further comprising:*

*the memory having set therein plural said patterns having respective, different relative brightnesses in the memory accessible by the brightness controller; and*

*the controller selecting among the patterns to thereby adjust the brightness of the display of the image.*

*41. The apparatus as claimed in claim 37, wherein the setting is performed by a calculation whereby the brightness obtained by one subframe of the plurality of subframes having an arbitrary brightness is twice the brightness obtained by another subframe of the plurality of subframes having a brightness next to that of the one subframe.*

*42. The apparatus as claimed in claim 37, further comprising:*

*the memory having set therein the number of sustain emissions of each subframe such that the sum of the squares of errors with ideal values in each gray level becomes a minimum and thereby to make the relation between the gray level and the corresponding brightness linear.*

*43. The apparatus as claimed in claim 37, further comprising:*

*the memory having set therein the number of sustain emissions so that the brightness of one subframe of the plurality of subframes having a next larger gray level than that of another subframe of the plurality of subframes does not exceed the brightness of the another subframe, for the brightness of the another subframe having the arbitrary gray level.*

*44. The apparatus as claimed in claim 37, further comprising:*

*the memory having set therein the number of sustain emissions of each subframe such that the sum of the absolute values of errors with the ideal values in each gray level becomes a minimum in order to make the relation between the gray level and the corresponding brightness linear.*

*45. The apparatus as claimed in claim 37, further comprising:*

*the memory having set therein the number of sustain emissions of each subframe is set in an anti-geometrical progression corresponding to the predetermined brightness of each subframe of the plurality of subframes.*

*46. A method of controlling a gray scale of a plasma display device, wherein said method comprises the steps of:*

*forming a frame for an image by a plurality of subframes each having a specific weight value, each of said subframes including an address period and a sustain discharge period, said address period being a common period to carry out address discharge on each selected display line so as to selectively accumulate wall charges for cells formed on said each selected display line, said sustain discharge period being a common period to carry out sustain emissions on said each selected display line, the sustain emissions on said each selected display line being carried out in said sustain discharge period;*

*calculating numbers of sustain emissions of said plurality of subframes so as to make a ratio of brightnesses of said plurality of subframes substantially equal a ratio of the specific weight values of said plurality of subframes, wherein a ratio of numbers of sustain emissions of said plurality of subframes does not equal the ratio of the specific weight values of said plurality of subframes; and*

*displaying the image on said plasma display device by optionally combining said subframes each having the calculated number of the sustain emissions, and thereby a brightness-drop caused in accordance with increasing the number of sustain emissions is compensated.*

*47. A method of controlling a gray scale of a plasma display device as claimed in claim 46, wherein the number of sustain emissions of said each subframe is so calculated, that the brightness obtained by one subframe of said plurality of subframes having an arbitrary brightness is twice the brightness obtained by another subframe of said plurality of subframes having a brightness next to that of said one subframe.*

*48. A plasma display device comprising at least one pair of electrodes for carrying out a discharge operation, wherein:*

*said plasma display device is driven by separating address periods in which display data are written in a common period for each display line in the screen so as to accumulate wall charges necessary for sustain discharge from sustain discharge periods in which sustain discharge for light emission is repeated in a common period for each display line, one frame forming an image is constituted by a plurality of subframes each having a specific weight value, numbers of sustain emissions of said plurality of subframes are calculated so as to make a ratio of brightnesses of said plurality of subframes substantially equal a ratio of the specific weight values of said plurality of subframes, wherein a ratio of numbers of sustain emissions of said plurality*

*of subframes does not equal the ratio of the specific weight values of said plurality of subframes, and the image is displayed on said plasma display device by optionally combining said subframes each having the calculated number of the sustain emissions, and thereby a brightness-drop caused in accordance with increasing the number of sustain emissions is compensated.*

*49. A plasma display device as claimed in claim 48, wherein said plasma display device is a three-electrode plasma display device.*

*50. A plasma display device as claimed in claim 49, wherein said three-electrode plasma display device is a three-electrode surface discharge AC plasma display device.*

*51. A plasma display device as claimed in claim 49, wherein said three-electrode plasma display device comprises:*

*first and second electrodes arranged in parallel with each other; and*

*third electrodes orthogonal to said first and second electrodes, said first electrode being commonly connected together, and said second electrodes being arranged for display lines, respectively, wherein said display device has a surface discharge structure employing wall charges as memory media.*

*52. A plasma display device as claimed in claim 51, wherein said three-electrode plasma display device further comprises:*

*a first substrate, and said first and second electrodes being arranged in parallel with each other on said first substrate and paired for respective display lines;*

*a second substrate spaced apart from and facing said first substrate, and said third electrodes being arranged on said second substrate away from and orthogonal to said first and second electrodes;*

*a wall charge accumulating dielectric layer covering the surfaces of said first and second electrodes and said first substrate;*

*a phosphor formed over said third electrodes and said second substrate;*

*a discharge gas sealed in a cavity defined between said first and second substrates; and*

*cells formed at intersections where said first and second electrodes cross said third electrodes.*

*53. A plasma display device as claimed in claim 48, wherein said plasma display device is a two-electrode plasma display device.*

*54. A plasma display device as claimed in claim 53, wherein said two-electrode plasma display device is a two-electrode facing-discharge AC-driven plasma display panel.*

*55. A plasma display device as claimed in claim 53, wherein said two-electrode plasma display device comprises:*

*a plurality of first electrodes; and a plurality of second electrodes orthogonal to said first electrodes, and said first electrodes being arranged for display lines, respectively wherein said display device has a surface discharge structure employing wall charges as memory media.*

*56. A plasma display device as claimed in claim 55, wherein said two-electrode plasma display device further comprises:*

*a first substrate, and said first electrodes being arranged in parallel on said first substrate;*

*a second substrate spaced apart from and facing said first substrate, and said second electrodes being arranged on said second substrate away from and orthogonal to said first electrodes; a wall charge accumulating dielectric layer covering the surfaces of said first electrodes and said first substrate;*

*a phosphor formed over said second electrodes and said second substrate; a discharge gas sealed in a cavity defined between said first and second substrates; and cells formed at intersections where said first electrodes cross said second electrodes.*

*57. A plasma display device as claimed in claim 48, wherein said plasma display device further comprises a memory for setting and storing the number of sustain emissions in each subframe, and information on the number of sustain emissions in said each subframe is read at any time from said memory.*

*58. A plasma display device as claimed in claim 57, wherein said memory is constituted by a vacant area of a driving wave-form memory device in said plasma display device, and the information on the number of sustain emissions in said each subframe is set in the vacant area of said driving wave-form memory device.*

*59. A plasma display device as claimed in claim 57, wherein said plasma display device further comprises a brightness controller for adjusting the brightness, and said brightness controller selects one piece from the information on the number of sustain emissions in said each subframe set in said memory.*

*60. A plasma display device as claimed in claim 57, wherein the number of sustain emissions in said each subframe is set as a plurality of combinations in said memory, and an arbitrary one of said plurality of combinations is selected by selection signals supplied from the outside of said plasma display device.*

*61. A plasma display device as claimed in claim 57, wherein said plasma display device further comprises a consumed current controller for controlling and keeping the consumed current below a predetermined value, the number of sustain emissions in said each subframe is set as a plurality of combinations in said memory, an arbitrary one of said plurality of combinations is selected in response to the output from said consumed current controllers and thereby the power consumption is kept constant regardless of the change of displayed rate.*

*62. A plasma display device as claimed in claim 57, wherein the information on the number of sustain emissions in said each subframe is supplied from the outside of said plasma display device.*

*63. A method of controlling a gray scale of a plasma display device, wherein said method comprises:*

*forming a frame for an image by a plurality of subframes each having a specific weight value, each of said subframes including an address period and a sustain discharge period, said address period being a common period to carry out address discharge on each selected display line so as to selectively accumulate wall charges for cells formed on said each selected display line, said sustain discharge period being a common period to carry out sustain emissions on said each selected display line, the sustain emissions on said each selected display line being carried out in said sustain discharge period; and*

*displaying the image on said plasma display device by optionally combining gray levels of said plurality of subframes, wherein numbers of sustain emissions of said plurality of subframes are calculated so as to make a ratio of brightnesses of said plurality of subframes substantially equal a ratio of the specific weight values*

*of said plurality of subframes and a ratio of numbers of sustain emissions of said plurality of subframes does not equal the ratio of the specific weight values of said plurality of subframes, and thereby a brightness-drop caused in accordance with increasing the number of sustain emissions is compensated.*

*64. A method of controlling a gray scale of a plasma display device as claimed in claim 63, wherein the number of sustain emissions of said each subframe is so calculated, that a sum of the squares of errors with ideal values in said each gray level becomes a minimum, in order to make a relation between said each gray level and corresponding brightness linear.*

*65. A method of controlling a gray scale of a plasma display device as claimed in claim 64, wherein a brightness of one subframe of said plurality of subframes having a next larger gray level than that of another subframe of said plurality of subframes does not exceed a brightness of said another subframe, for the brightness of said another subframe having said arbitrary gray level.*

*66. A method of controlling a gray scale of a plasma display device as claimed in claim 64, wherein a sum of the numbers of sustain emissions of several subframes in said plurality of subframes is specified.*

*67. A method of controlling a gray scale of a plasma display device as claimed in claim 64, wherein a brightness of an optional subframe is specified in said plurality of subframes.*

*68. A method of controlling a gray scale of a plasma display device as claimed in claim 63, wherein a number of sustain emissions of said each subframe is so calculated, that a sum of the absolute values of errors with ideal values in said each gray level becomes a minimum, in order to make a relation between said each gray level and corresponding brightness linear.*

*69. A method of controlling a gray scale of a plasma display device as claimed in claim 68, wherein a brightness of one subframe of said plurality of subframes having a next larger gray level than that of another subframe of said plurality of subframes does not exceed a brightness of said another subframe, for the brightness of said another subframe having said arbitrary gray level.*

*70. A method of controlling a gray scale of a plasma display device as claimed in claim 68, wherein a sum of the numbers of sustain emissions of several subframes in said plurality of subframes is specified.*

*71. A method of controlling a gray scale of a plasma display device as claimed in claim 68, wherein a brightness of an optional subframe is specified in said plurality of subframes.*

*72. A plasma display device comprising at least one pair of electrodes for carrying out a discharge operation, wherein:*

*said plasma display device is driven by separating address periods in which display data are written in a common period for each display line in a screen so as to accumulate wall charges necessary for sustain discharge from sustain discharge periods in which sustain discharge for light emission is repeated in a common period for each display line, one frame forming an image is constituted by a plurality of subframes each having a specific weight value, and an image on said plasma display device is displayed by optionally combining gray levels of said plurality of subframes, wherein numbers of sustain emissions of said plurality of subframes are calculated so as to make a ratio of brightnesses of said plurality of subframes substantially equal a ratio of the specific weight values of said plurality of subframes, and a ratio of numbers of sustain emissions of said plurality of subframes does not equal the ratio of the specific weight values of said plurality of subframes, and thereby a brightness-drop caused in accordance with increasing the number of sustain emissions is compensated.*

* * * * *

UNITED STATES PATENT AND TRADEMARK OFFICE

CERTIFICATE OF CORRECTION

PATENT NO. : RE 40,769 E
APPLICATION NO. : 09/938303
DATED : June 23, 2009
INVENTOR(S) : Keishin Nagaoka et al.

It is certified that error appears in the above-identified patent and that said Letters Patent is hereby corrected as shown below:

Title Page, Column 2 item 57 (Abstract), Line 22, change "*emission*" to --*emissions*--.

Title Page, Column 2 item 57 (Abstract), Line 22, change "*by the*" to --*by*--.

Column 14, Line 51, change "brightness" to --brightnesses--.

Column 14, Line 61, change "of" to --of a--.

Column 14, Line 63, change "subframes" to --subframe--.

Column 15, Line 13, change "*at*" to --*as*--.

Column 15, Line 13, change "brightness" to --brightnesses--.

Column 16, Line 10, change "second substrate" to --second electrodes--.

Column 16, Line 25, change "search" to --each--.

Column 16, Line 35, change "aid" to --said--.

Column 16, Line 53, change "keep" to --kept--.

Column 16, Line 56, change "emissions" to --emission--.

Column 16, Line 65, after "wherein" delete "[each gray level]".

Column 16, Lines 65-67, change "numbers of sustain emissions of said plurality of subframes are calculated so as to make" to --*numbers of sustain emissions of said plurality of subframes are calculated so as to make*--.

Column 17, Line 6, change "said plurality of subframes" to --*said plurality of subframes*--.

Column 17, Lines 6-8, change "[of the specific weight values] of [each gray level] the specific weight values of said plurality of subframes" to --of the specific weight values of [each gray level] *said plurality of subframes*--.

UNITED STATES PATENT AND TRADEMARK OFFICE

CERTIFICATE OF CORRECTION

PATENT NO. : RE 40,769 E
APPLICATION NO. : 09/938303
DATED : June 23, 2009
INVENTOR(S) : Keishin Nagaoka et al.

It is certified that error appears in the above-identified patent and that said Letters Patent is hereby corrected as shown below:

Column 18, Line 1, after "wherein" delete "[each gray level]".

Column 18, Lines 1-3, change "numbers of sustain emissions of said plurality of subframes are calculated so as to make" to --*numbers of sustain emissions of said plurality of subframes are calculated so as to make*--.

Column 18, Line 7, change "*subframes*," to --*subframes* [,]--.

Column 18, Line 9, change "said plurality of subframes" to --*said plurality of subframes*--.

Column 22, Line 43, change "*displayed*" to --*display*--.

Signed and Sealed this

Twentieth Day of October, 2009

David J. Kappos

David J. Kappos
*Director of the United States Patent and Trademark Office*